(12) United States Patent
Hosotani

(10) Patent No.: US 8,027,177 B2
(45) Date of Patent: Sep. 27, 2011

(54) ISOLATED SWITCHING POWER SUPPLY APPARATUS

(75) Inventor: Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/980,433

(22) Filed: Dec. 29, 2010

(65) Prior Publication Data

US 2011/0090715 A1 Apr. 21, 2011

Related U.S. Application Data

(63) Continuation of application No. PCT/JP2009/060734, filed on Jun. 12, 2009.

(30) Foreign Application Priority Data

Jul. 23, 2008 (JP) .................. 2008-190129
Jul. 24, 2008 (JP) .................. 2008-191173

(51) Int. Cl.
*H02M 1/12* (2006.01)
(52) U.S. Cl. .......................... 363/47; 363/127
(58) Field of Classification Search ............ 363/47, 363/45, 90, 126
See application file for complete search history.

(56) References Cited

U.S. PATENT DOCUMENTS

| 6,163,466 | A | * | 12/2000 | Davila et al. .................. 363/17 |
| 6,304,460 | B1 | | 10/2001 | Cuk |
| 2004/0179377 | A1 | | 9/2004 | Tamura |
| 2004/0179378 | A1 | | 9/2004 | Tamura |
| 2006/0062024 | A1 | | 3/2006 | Hosotani et al. |
| 2006/0120114 | A1 | | 6/2006 | Kawasaki et al. |

FOREIGN PATENT DOCUMENTS

| JP | 2001-218457 A | 8/2001 |
| JP | 2003-533163 A | 11/2003 |
| JP | 2004-297994 A | 10/2004 |
| JP | 2004-297995 A | 10/2004 |
| JP | 2007-043858 A | 2/2007 |
| WO | 2004/019472 A1 | 3/2004 |

OTHER PUBLICATIONS

Official Communication issued in International Patent Application No. PCT/JP2009/060734, mailed on Aug. 18, 2009.

* cited by examiner

*Primary Examiner* — Shawn Riley
(74) *Attorney, Agent, or Firm* — Keating & Bennett, LLP

(57) ABSTRACT

A transformer includes a first secondary winding, a second secondary winding, and a third secondary winding. The second secondary winding and the third secondary winding are wound to include the same number of turns and to have opposite magnetic polarities. A low-pass filter includes a second inductor defined by a leakage inductance of the second secondary winding connected in series with the second secondary winding, a second inductor defined by a leakage inductance of the third secondary winding connected in series with the third secondary winding, and a second capacitor. An output voltage is output from an output terminal of the low-pass filter.

15 Claims, 27 Drawing Sheets

ISOLATED SWITCHING POWER SUPPLY APPARATUS

BACKGROUND OF THE INVENTION

1. Field of the Invention

The present invention relates to an isolated switching power supply apparatus including a compound transformer that includes a plurality of secondary windings and that utilizes a leakage inductance and does not require an external choke coil.

2. Description of the Related Art

An output current smoothing low-pass filter including an external inductor and a smoothing capacitor has typically been used as an isolated switching power supply apparatus. It is known that a leakage inductance caused in a secondary side of a transformer is used in order to decrease an inductance value of the external inductor. Also known is a technique in which the leakage inductance is intentionally increased by reducing the degree of magnetic coupling of the transformer.

In accordance with Japanese Unexamined Patent Application Publication No. 2001-218457, a leakage inductance is intentionally produced by arranging a core gap GAP4 in a core of an isolated transformer T2 as illustrated in FIGS. 1A and 1B, such that an external inductor L is miniaturized.

In accordance with Japanese Unexamined Patent Application Publication No. 2003-533163 as illustrated in FIG. 2, an isolated transformer including a primary winding and a second winding, each having a number of turns N, is provided, and a leakage inductance produced by the isolated transformer is intentionally increased to be used as an inductor L2.

As illustrated in FIG. 3, Japanese Unexamined Patent Application Publication No. 2003-533163 discloses a technique in which a leakage inductance of a tertiary winding 5c of a transformer T1 is increased by low-coupling a primary winding 5a to the tertiary winding 5c so as to eliminate the need for any external inductors.

As illustrated in FIG. 4, Japanese Unexamined Patent Application Publication No. 2007-43858 discloses a technique in which a leakage inductance L1 of a transformer T is used so as to eliminate the need for an external choke coil.

The isolated switching power supply apparatuses described above suffer from a basic problem. More specifically, a leakage inductance of a transformer may be used for an output current smoothing inductor. However, a leakage inductance only has a small inductance value and provides relatively low output current smoothing performance. A large output current ripple results. The output current ripple becomes large particularly when a difference between a voltage produced in a secondary winding during an on period of a primary switching element and a voltage produced in the secondary winding during an off period of the primary switching element increases in response to a change in an on time ratio of the primary switching element in order to control the output voltage.

In addition, in an attempt to increase the value of a leakage inductance, the degree of magnetic coupling of a transformer may be intentionally decreased by arranging an air gap in the core of the transformer. Such an arrangement causes an energy transfer inductance value to be decreased, which leads to a bulky transformer.

Furthermore, if the leakage inductance of the transformer is used, or if a choke coil is used for an external inductor, these components include a magnetic body as a core. A direct-current magnetic flux is produced in the magnetic body in response to an output current. In order to prevent magnetic saturation, the use of a bulky transformer or a bulky choke coil is unavoidable.

SUMMARY OF THE INVENTION

To overcome the problems described above, preferred embodiments of the present invention provide a compact isolated switching power supply apparatus that does not require a choke coil as an external inductor, and that sufficiently reduces an output current ripple.

According to a preferred embodiment of the present invention, an isolated switching power supply apparatus arranged to transfer energy from a primary side to a secondary side thereof in response to an on/off operation of a first switching circuit includes a direct-current power supply input unit arranged to receive a direct-current input voltage, a first transformer including at least a first primary winding, a first secondary winding, a second secondary winding, and a third secondary winding that are magnetically coupled to each other, the first switching circuit including a parallel circuit that includes a first switching element, a first capacitor, and a first diode, a series circuit that includes the first primary winding and the first switching circuit, connected in series with the direct-current power supply input unit, a first inductor defined by a leakage inductance of the second secondary winding connected in series with the second secondary winding, and a second inductor defined by a leakage inductance of the third secondary winding connected in series with the third secondary winding, and a second capacitor defining a low-pass filter together with the first inductor and the second inductor. The second secondary winding and the third secondary winding are preferably wound to include substantially the same number of turns but to have opposite magnetic polarities from one another, for example. The first secondary winding, the second secondary winding, and the third secondary winding are preferably connected in series with the second capacitor to define a closed loop. An output voltage is output from an output terminal of the low-pass filter.

Preferably, the first primary winding and the first secondary winding are wound to have the same magnetic polarity, for example, and a forward converter includes a second diode that is arranged to remain turned on during an on period of the first switching circuit, and a third diode that is arranged to remain turned on during an off period of the first switching circuit.

Preferably, the first primary winding and the first secondary winding are wound so as to have opposite magnetic polarities, and a flyback converter is provided on the first secondary winding, including a rectifying and smoothing circuit including a first diode that is arranged to remain turned on during an off period of the first switching circuit, and a third capacitor that is arranged to perform a discharging operation during the on period of the first switching circuit and to perform a charging operation during the off period of the first switching circuit.

Preferably, the isolated switching power supply apparatus includes a fourth capacitor, a second switching circuit including a parallel circuit including a second switching element, a fifth capacitor, and a fourth diode, and a third inductor defined by a leakage inductance of the first primary winding connected in series with the first primary winding. A series circuit including the first primary winding and the first switching circuit is preferably connected to the direct-current power supply input unit, and a series circuit including the fourth capacitor and the second switching circuit is connected in parallel with one of the first primary winding and the first switching circuit.

Preferably, the isolated switching power supply apparatus includes a second switching circuit including a parallel circuit that includes a second switching element, a fifth capacitor, and a fourth diode, a sixth capacitor, a seventh capacitor, and a third inductor defined by a leakage inductance of the first primary winding connected in series with the first primary winding. Each of a series circuit including the first switching circuit and the second switching circuit and a series circuit including the sixth capacitor and the seventh capacitor is preferably connected in parallel with the direct-current power supply input unit, and a half-bridge circuit is preferably provided by connecting the first primary winding between a junction of the first switching circuit and the second switching circuit and a junction of the sixth capacitor and the seventh capacitor, for example.

Preferably, the isolated switching power supply apparatus includes a second switching circuit including a parallel circuit that includes a second switching element, a fifth capacitor, and a fourth diode, a third switching circuit including a parallel circuit that includes a third switching element, an eighth capacitor, and a fifth diode, a fourth switching circuit including a parallel circuit that includes a fourth switching element, a ninth capacitor, and a sixth diode, and a third inductor defined by a leakage inductance of the first primary winding connected in series with the first primary winding. Each of a series circuit including the first switching circuit and the second switching circuit and a series circuit including the third switching circuit and the fourth switching circuit is preferably connected in parallel with the direct-current power supply input unit, and a full-bridge circuit is provided by connecting the first primary winding between a junction of the first switching circuit and the second switching circuit and a junction of the third switching circuit and the fourth switching circuit, for example.

The transformer preferably includes the first primary winding including a second primary winding and a third primary winding with one end of the second primary winding being connected to one end of the third primary winding. The isolated switching power supply apparatus preferably includes a second switching circuit including a parallel circuit including a second switching element, a fifth capacitor, and a fourth diode, and each of a series circuit including the second primary winding and the second switching circuit and a series circuit including the third primary winding and the first switching circuit is preferably connected in parallel with the direction-current power supply input unit, for example.

Preferably, the isolated switching power supply apparatus further includes the transformer including a fourth primary winding, and a fourth secondary winding, a second switching circuit including a parallel circuit that includes a second switching element, a fifth capacitor, and a fourth diode, a fourth capacitor, a tenth capacitor, a third inductor defined by a leakage inductance of the first primary winding connected in series with the first primary winding, and a fourth inductor defined by a leakage inductance of the fourth primary winding connected in series with the fourth primary winding. Each of a series circuit including the fourth primary winding and the first switching circuit and a series circuit including the first primary winding and the tenth capacitor is preferably connected in parallel with the direct-current power supply input unit, and a series circuit including the second switching circuit and the fourth capacitor is preferably connected in parallel with one of the first primary winding and the first switching circuit, for example.

The transformer preferably includes a first secondary winding and a fourth secondary winding, the first secondary winding preferably being wound such that energy is transferred from the primary side to the secondary side of the transformer during an on period of the first switching circuit and an off period of the second switching circuit, and the fourth secondary winding preferably being wound such that energy is transferred from the primary side to the secondary side of the transformer during an off period of the first switching circuit and an on period of the second switching circuit. The first secondary winding is preferably connected in series with the fourth secondary winding. The isolated switching power supply apparatus preferably includes a fifth inductor defined by an inductance of the fourth secondary winding connected in series with the fourth secondary winding, and a second diode that remains turned on during the on period of the first switching circuit is connected to a third diode that remains turned on during the off period of the first switching circuit.

The ratio of winding of the first secondary winding to the fourth secondary winding is preferably set to approximately 2:1, for example.

A center-tap rectifying circuit is preferably provided by connecting one end of the first secondary winding to one end of the fourth secondary winding and by connecting the other end of each of the first secondary winding and the fourth secondary winding to one of the second diode and the third diode, for example.

A voltage doubler rectifying circuit is preferably provided that includes a second diode including a cathode connected to one end of the first secondary winding and an anode thereof connected to one end of an eleventh capacitor, a third diode including an anode connected to the one end of the first secondary winding and a cathode connected to a third capacitor, and the other end of the first secondary winding is connected to the other end of the eleventh capacitor, and the other end of the third capacitor, for example.

The second secondary winding is preferably connected between one end of the first secondary winding and a high-voltage terminal of the second capacitor, and the third secondary winding is connected between the other end of the first secondary winding and a low-voltage terminal of the second capacitor, for example.

The first transformer preferably further includes a fifth secondary winding and a sixth secondary winding, wherein the fifth secondary winding and the sixth secondary winding are preferably wound to include the same number of turns and to have opposite magnetic polarities, for example. The second secondary winding, the third secondary winding, the fifth secondary winding, and the sixth secondary winding are preferably connected in series with the first secondary winding. The isolated switching power supply apparatus preferably further includes a sixth inductor defined by a leakage inductance of the fifth secondary winding connected in series with the fifth secondary winding, a seventh inductor defined by a leakage inductance of the sixth secondary winding connected in series with the sixth secondary winding, a second capacitor defining a first low-pass filter together with the sixth inductor and the seventh inductor, and a third capacitor defining a second low-pass filter together with the second inductor Lrf1 and the third inductor, for example, and an output voltage is output from an output terminal of the first low-pass filter.

The first transformer preferably further includes a fifth secondary winding and a sixth secondary winding, wherein the fifth secondary winding and the sixth secondary winding are preferably wound to include the same number of turns and have opposite magnetic polarities, for example. The second secondary winding, the third secondary winding, the fifth secondary winding, and the sixth secondary winding are preferably connected in series with the first secondary winding. The isolated switching power supply apparatus preferably further includes a fifth inductor defined by a leakage inductance of the fourth secondary winding connected in series with the fourth secondary winding, a sixth inductor defined by a leakage inductance of the fifth secondary winding connected in series with the fifth secondary winding, a seventh inductor defined by a leakage inductance of the sixth secondary winding connected in series with the sixth secondary winding, a second capacitor defining a first low-pass filter together with the sixth inductor and the seventh inductor, a third capacitor defining a second low-pass filter together with the second inductor and the third inductor, and an eleventh capacitor defining a third low-pass filter together with the fifth inductor, and an output voltage is output from an output terminal of the first low-pass filter.

Since a magnetic component is provided by a transformer, no external inductor is required, and a switching power supply apparatus is miniaturized.

Since a winding that does not affect voltage conversion is provided to produce a leakage inductance, a relatively large leakage inductance is achieved, and the output current ripple is sufficiently reduced.

Since the secondary windings are wound so as to have opposite magnetic polarities with respect to the flowing direction of an output current, direct-current magnetic fluxes cancel each other, and the requirement of magnetic saturation is prevented.

Since the leakage inductance has a low magnetic permeability and is less affected by the requirement of magnetic saturation, the transformer can be miniaturized. Thus, the size of the switching power supply apparatus can be reduced.

The secondary windings advantageously reduce switching noise caused when the voltage of the transformer is inverted.

The resistance to common node noise is increased by respectively connecting the secondary windings to a high-voltage side and to a low-voltage side of at least one of the secondary windings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 5:
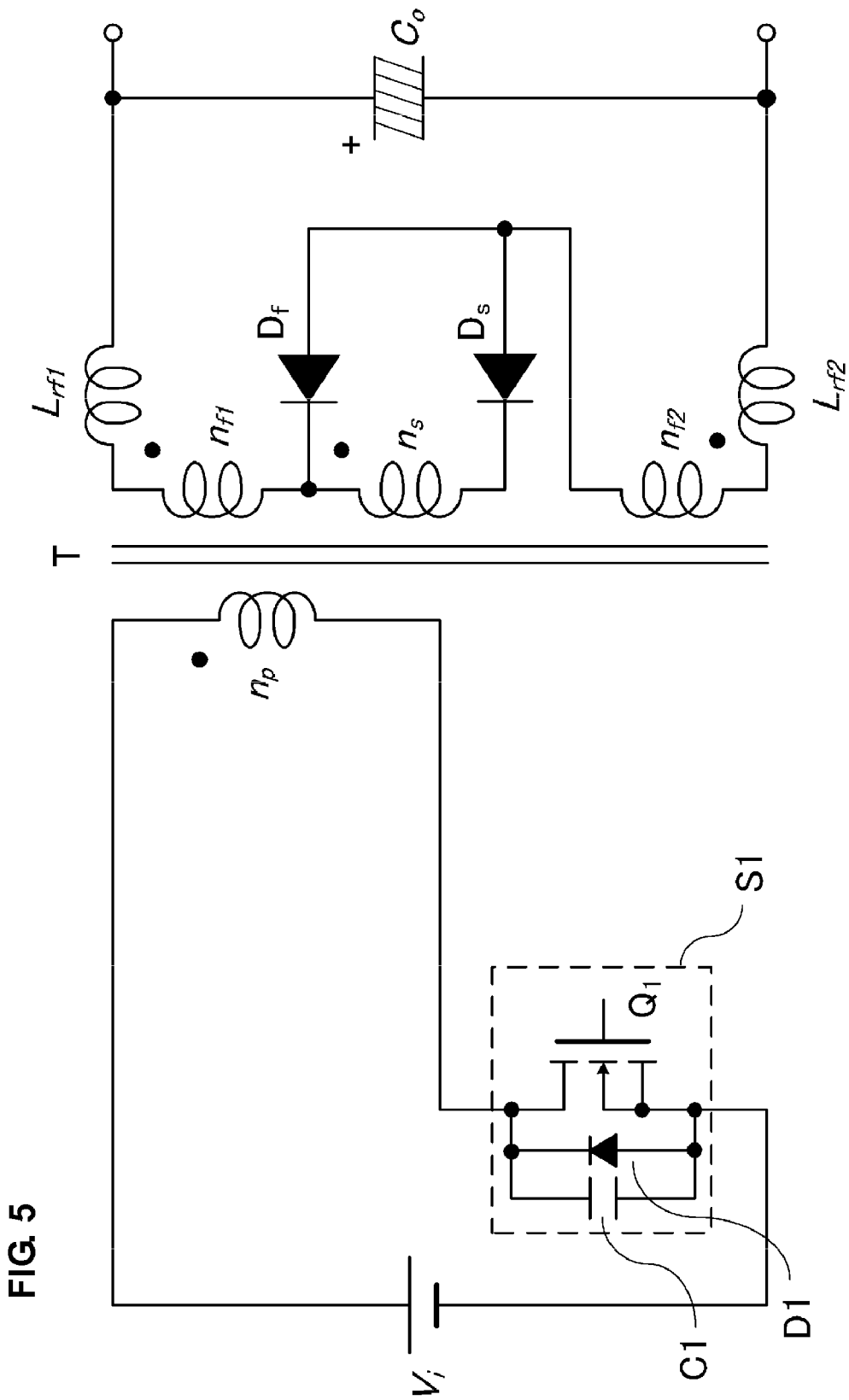
FIG. 5 is a circuit diagram of the isolated switching power supply apparatus of a first preferred embodiment of the present invention.

FIG. 5 is a circuit diagram of the isolated switching power supply apparatus according to a first preferred embodiment of the present invention.

In the isolated switching power supply apparatus as illustrated in FIG. 5, a series circuit including a first primary winding np and a first switching circuit S1 is connected to both ends of a direct-current power supply input unit to which a direct-current input voltage Vi is applied. The first primary winding np defines a compound transformer T together with a first secondary winding ns, a second secondary winding nf1, and a third secondary winding nf2. The first secondary winding ns includes one end thereof connected to one end of the second secondary winding nf1 and the cathode of a third diode Df, and the other end thereof connected to the cathode of a second diode Ds. The second secondary winding nf1 includes one end thereof connected to a high-voltage end of the first secondary winding ns and the other end thereof connected to a high-voltage output terminal. The third secondary winding nf2 includes one end thereof connected to the anode of the third diode Df and the anode of the second diode Ds, and the other end thereof connected to a low-voltage output terminal. A second capacitor Co functions as a smoothing capacitor and is connected in parallel with the output terminals.

It is noted that the first primary winding np and the first secondary winding ns are preferably designed to be in a forward system, for example.

The second secondary winding nf1 and the third secondary winding nf2 are preferably wound to include the same number of turns and to have opposite magnetic polarities, such that voltages generated in the second and third secondary windings nf1 and nf2 cancel each other. Magnetic fluxes which do not intersect the third secondary winding nf2, of the direct-current magnetic fluxes produced in response to a current flowing through the second secondary winding nf1, preferably function as a first inductor Lrf1 defined by a leakage inductance. Magnetic fluxes that do not intersect the second secondary winding nf1, of the magnetic fluxes generated in response to a current flowing through the third secondary winding nf2, preferably function as a second inductor Lrf2 defined by a leakage inductance.

With this arrangement, during an on period of the first switching circuit S1, a current flows through the third secondary winding nf2→the second diode Ds→the first secondary winding ns→the second secondary winding nf1 in that order. Only a voltage generated in the first secondary winding ns is output to the output terminals. During an off period of the first switching circuit S1, a current flows through the third secondary winding nf2→the third diode Df→the second secondary winding nf1 in that order. Energy charged on the second capacitor Co is output to the output terminals.

The first switching circuit S1 preferably includes a parallel connecting circuit including a first switching element Q1, a first diode D1, and a first capacitor C1, for example.

If the first switching element Q1 is defined by a field-effect transistor, such as an MOSFET, for example, a parasitic diode thereof is preferably used as the first diode D1 and a parasitic capacitance thereof is preferably used as the first capacitor C1, for example. This arrangement eliminates the need to mount these circuit elements as individual components, thereby reducing the number of components.

On/off timings of the first switching element Q1 are controlled as described below. An output voltage detector circuit or other suitable circuit arranged to detect an output voltage is arranged and a voltage exceeding a predetermined voltage is fed back preferably by an isolated feedback device, such as a photocoupler, for example. The first switching element Q1 is on/off controlled in response to a feedback voltage.

If the on/off control is performed based on PWM (pulse-width modulation), a switching frequency remains constant or substantially constant. The frequency component of EMI noise generated in response to a switching operation is concentrated at a constant or substantially constant frequency. Thus, a step of preventing noise is easy to perform.

Second Preferred Embodiment

Figure 6:
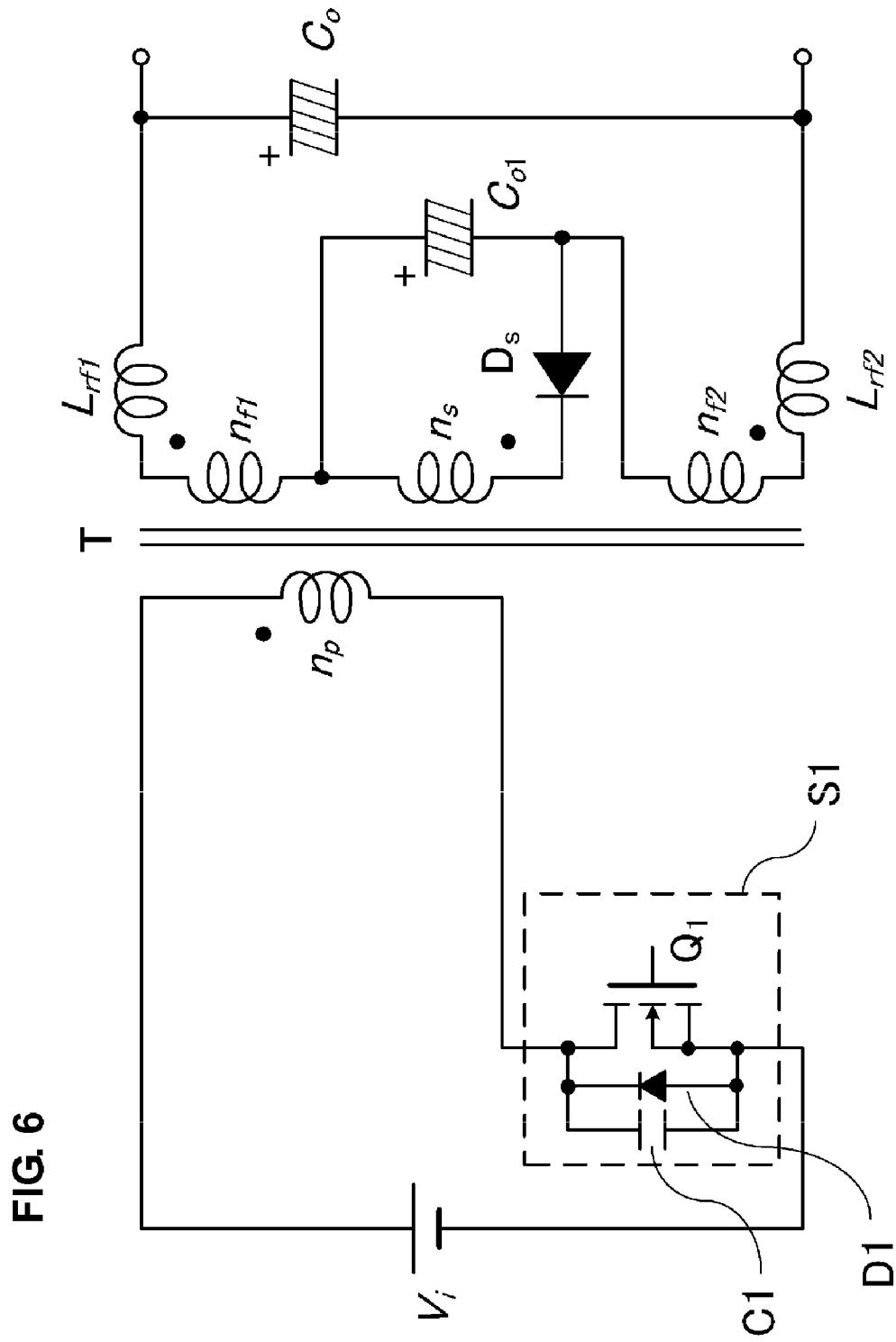
FIG. 6 is a circuit diagram of the isolated switching power supply apparatus of a second preferred embodiment of the present invention.

FIG. 6 is a circuit diagram of the isolated switching power supply apparatus according to a second preferred embodiment of the present invention. The first primary winding np and the first secondary winding ns are preferably arranged to have opposite magnetic polarities as compared to those in the first preferred embodiment. More specifically, the first preferred embodiment is preferably a forward system while the second preferred embodiment is preferably a flyback system. Accordingly, the third diode Df is not required. To effectively reduce a current ripple, a third capacitor Co1 is preferably connected instead of the third diode Df, for example. With this arrangement, a current, after being smoothed by the third capacitor Co1, is applied to a low-pass filter including a second secondary winding nf1, a first inductor Lrf1 and a second capacitor Co. Thus, the current ripple is further reduced.

While the first switching circuit S1 defined by a parallel circuit including the first switching element Q1, the first diode D1, and the first capacitor C1 remains on with the above-described arrangement, a current flows through the third secondary winding nf2→the third capacitor Co1→the second secondary winding nf1 in that order. Energy charged on the third capacitor Co1 and the second capacitor Co2 is output to the output terminals. While the first switching circuit S1 remains turned off, a current flows through the third secondary winding nf2→the second diode Ds→the first secondary winding ns→the second secondary winding nf1 in that order. Only a voltage generated in the first secondary winding ns is output to the output terminals.

The remainder of the second preferred embodiment is substantially the same as the first preferred embodiment, and the discussion thereof is omitted.

The isolated switching power supply apparatus according to the second preferred embodiment achieves similar advantages as those achieved by the first preferred embodiment of the present invention as described above.

Third Preferred Embodiment

Figure 7:
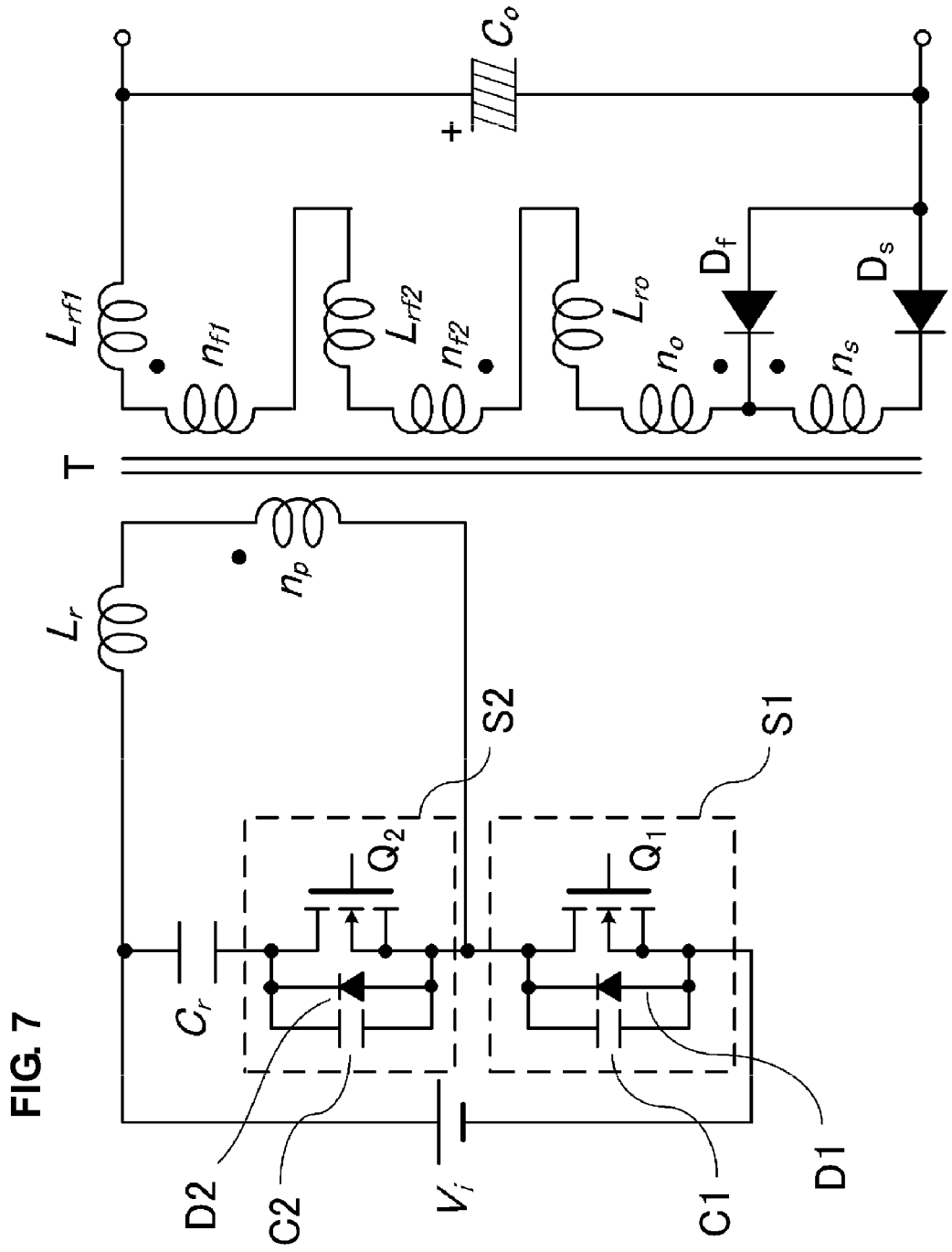
FIG. 7 is a circuit diagram of the isolated switching power supply apparatus of a third preferred embodiment of the present invention.

FIG. 7 is a circuit diagram of the isolated switching power supply apparatus according to a third preferred embodiment of the present invention. In the isolated switching power supply apparatus as illustrated in FIG. 7, a series circuit including a third inductor Lr, a first primary winding np, and a first switching circuit S1 is preferably connected between a + terminal and a − terminal of a power supply input unit supplied with the direct-current input voltage Vi. A junction of a fourth capacitor Cr and the first switching circuit S1 and a series circuit including the fourth capacitor Cr and the second switching circuit S2 are preferably connected in parallel with one of the first primary winding np and the first switching circuit S2, for example.

The first switching circuit S1 preferably includes a parallel connecting circuit including the first switching element Q1, the first diode D1, and the first capacitor C1. The second switching circuit S2 preferably includes a parallel connecting circuit including a second switching element Q2, a fourth diode D2, and a fifth capacitor C2.

If the first switching element Q1 and the second switching element Q2 are defined by a field-effect transistor, such as a MOSFET, for example, a parasitic diode thereof may preferably be used for the first diode D1 and the fourth diode D2, and a parasitic capacitor may preferably be used for the first capacitor C1 and the fifth capacitor C2, for example. This arrangement eliminates the need to mount these circuit elements as individual components, thereby reducing the number of components.

If both the first switching circuit S1 and the second switching circuit S2 are turned on at the same time, a short circuit results. For this reason, an on/off operation is complementarily performed with a minimum amount of dead time permitted between on and off operations.

A first secondary winding ns and a fourth secondary winding no are preferably arranged on the secondary side of the compound transformer T, for example. The first primary winding np and the first secondary winding ns are preferably wound to have the same magnetic polarity, and the first primary winding np and the fourth secondary winding no are preferably wound to have opposite magnetic polarities.

In the compound transformer T, preferably, the first secondary winding ns includes one end thereof connected to the cathode of a second diode Ds and the other end thereof connected to the cathode of a third diode Df. The anode of the third diode Df is preferably connected to the anode of the second diode Ds. The fourth secondary winding no preferably includes one end thereof connected to the cathode of the fourth diode Df and the one end of the first secondary winding ns, and the other end thereof connected to one end of a third secondary winding nf2, for example.

The other end of the third secondary winding nf2 is preferably connected to one end of a second secondary winding nf1. The other end of the second secondary winding nf1 is preferably connected to a high-voltage output terminal. A second capacitor Co arranged to provide a smoothing function is preferably connected between the output terminals, for example.

The first primary winding np and the first secondary winding ns in the compound transformer T preferably have winding polarity in order to function in a forward system, such that power is output during an on period of the first switching circuit S1 and an off period of the second switching circuit S2. The fourth secondary winding no preferably has a winding polarity arranged to function in a flyback system, such that power is output during an off period of the first switching circuit S1 and an on period of the second switching circuit S2. During the on period of the first switching circuit S1 and the off period of the second switching circuit S2, a current flows through the second diode Ds→the first secondary winding ns→the fourth secondary winding no→the third secondary winding nf2→the second secondary winding nf1 in that order. Thus, an output voltage is supplied.

During the off period of the first switching circuit S1 and the on period of the second switching circuit S2, a current flows through the third diode Df→the fourth secondary winding no→the third secondary winding nf2→the second secondary winding nf1 in that order. Thus, an output voltage is supplied.

In accordance with the third preferred embodiment, the second secondary winding nf1 and the third secondary winding nf2 are preferably connected in the arrangement of the first secondary winding ns→the fourth secondary winding no→the third secondary winding nf2→the second secondary winding nf1 in that order. This arrangement minimizes the number of winding taps in the manufacture of the compound transformer T to three, and the compound transformer T is easy to manufacture. The connection order of the second secondary winding nf1 and the third secondary winding nf2 may preferably be reversed.

Thus, energy is transferred from the primary side to the secondary side of the compound transformer T during each of the on period and the off period of the first switching circuit S1. Energy transfer from the primary side to the secondary side is possible during substantially entire switching periods other than the minimum dead time. In the minimum dead time during which a transfer route is switched, the first inductor Lrf1, the second inductor Lrf2, and the fifth inductor Lro are defined by leakage magnetic fluxes of the transformer control current fluctuations. Thus, an output ripple noise is substantially reduced. The second capacitor Co arranged to provide a smoothing function is thus miniaturized.

The third inductor Lr is a leakage inductance that is defined by a leakage flux in series with the first primary winding np. The third inductor Lr reduces a noise component superimposed on the direct-current input voltage Vi.

Vo1 represents a voltage generated in the first secondary winding ns, Vo2 represents a voltage generated in the second secondary winding no, and Vo represents a voltage output to the output terminals. If the ratio of winding of the first secondary winding ns to the second secondary winding no is ns:no=2:1, the output voltage Vo=Vo1−Vo2=2Vo2−Vo2=Vo2 during the on period of the first switching circuit S1 and the off period of the second switching circuit S2. The output voltage Vo=Vo2 during the off period of the first switching circuit S1 and the on period of the second switching circuit S2. Thus, the ripple component of the output voltage Vo is eliminated. The remainder of the third preferred embodiment is substantially the same as the first preferred embodiment, and the discussion thereof is omitted here.

The isolated switching power supply apparatus of the third preferred embodiment achieves advantages that are similar to the advantages achieved by the first preferred embodiment of the present invention as described above.

Figure 8:
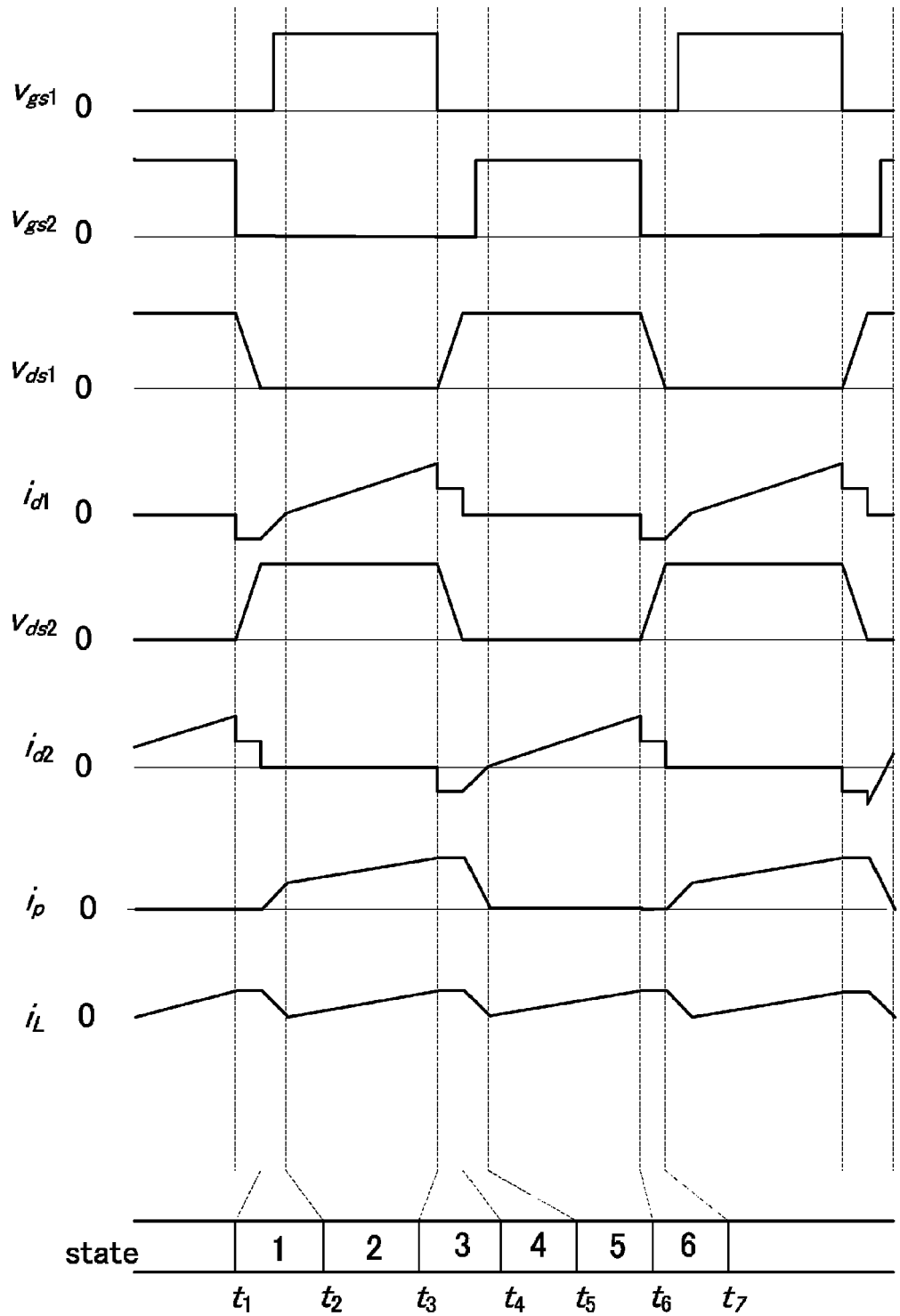
FIG. 8 is a waveform diagram of the isolated switching power supply apparatus of the third preferred embodiment of the present invention.

FIG. 8 is a waveform diagram of points in the circuit of the isolated switching power supply apparatus illustrated in FIG. 7. A circuit operation of the isolated switching power supply apparatus is described with reference to FIG. 7. Referring to FIG. 8, labels vgs1 and vgs2 respectively represent gate-source voltages of the switching elements Q1 and Q2, and substantively represent on/off operations of the switching elements Q1 and Q2. Labels vds1 and vds2 respectively represent drain-source voltages of the switching elements Q1 and Q2, and substantively represent voltage waveforms across the capacitors C1 and C2. Moreover, labels id1, id2, ip, and iL respectively represent current waveforms of currents flowing through the switching circuits S1 and S2, the first primary winding np, and the fifth inductor Lro.

An operation of the isolated switching power supply apparatus at standard ratings within one switching period Ts is segmented into six operational states of times t1 through t7. The circuit operation for each state is described below.

State 1 [t1−t2]    (1)

When the drain-source voltage Vds1 of the first switching element Q1 approaches a zero voltage after the first turn-off of the second switching element Q2, the first diode D1 is turned on. At this timing, the first switching element Q1 is turned on, and a zero voltage switching (ZVS) operation is performed.

State 2 [t2−t3]    (2)

The first switching element Q1 is turned on, causing a current to flow through the first primary winding np. A current id1 flowing through the first switching element Q1 and a current ip flowing through the first primary winding np linearly increase. Since the first secondary winding ns functions as a forward converter and the fourth secondary winding no functions as a flyback converter, a current flows through only the first secondary winding ns on the secondary side of the compound transformer T. For this reason, the third diode Ds is turned on and the fourth diode Df is turned off.

A current flowing through the secondary side of the compound transformer T flows through the third diode Ds→the first secondary winding ns→the fifth inductor Lro→the third secondary winding nf2→the second inductor Lrf2→the second secondary winding nf1→the first inductor Lrf1 in that order.

State 3 [t3–t4] (3)

When the first switching element Q1 is turned off, energy stored on the third inductor Lr charges the first capacitor C1 and the drain-source voltage Vds1 of the first switching element Q1 rises accordingly. At the same time, the fifth capacitor C2 is discharged, and the drain-source voltage Vds2 of the second switching element Q2 falls accordingly.

State 4 [t4–t5] (4)

When the drain-source voltage VDs2 of the second switching element Q2 falls close to a zero voltage, the fourth diode D2 is turned off. At this timing, the second switching element Q2 is turned on such that the zero voltage switching (ZVS) operation is performed.

State 5 [t5–t6] (5)

With the second switching element Q2 turned on, the first primary winding np is excited in a direction opposite to the direction in [state 2]. The current id2 flowing through the second switching element Q2 linearly increases. Since the first secondary winding ns functions as a forward converter with the fourth secondary winding no functioning as a flyback converter, a current flows through only the fourth secondary winding no in the secondary side of the compound transformer T. As a result, the third diode Ds is turned off, and the fourth diode Ds is turned on. The flow flowing through the secondary side of the compound transformer T flows through the fourth diode Df→the fourth secondary winding no→the fifth inductor Lro→the third secondary winding nf2→the second inductor Lrf2→the second secondary winding nf1→the first inductor Lrf1 in that order.

State 6 [t6–t7] (6)

With the second switching element Q2 turned off, energy stored on the third inductor Lr charges the fifth capacitor C2. The drain-source voltage Vds2 of the second switching element Q2 rises accordingly. At the same time, the first capacitor C1 is discharged, and the drain-source voltage Vds1 of the first switching element Q1 falls accordingly. Processing returns to [state 1].

On/off timings of the first switching element Q1 and the second switching element Q2 are controlled as described below. An output voltage detector circuit or other suitable circuit arranged to detect an output voltage is provided and a voltage exceeding a predetermined voltage is fed back preferably by an isolated feedback device, such as a photocoupler, for example. The first switching element Q1 and the second switching element Q2 are on/off controlled in response to a feedback voltage.

If the on/off control is performed based on PWM (pulse-width modulation), a switching frequency remains constant. The frequency component, such as EMI noise generated in response to a switching operation, is concentrated on a constant frequency. Thus, a step of preventing noise is easy to perform.

Preferred embodiments of the present invention are not limited to PWM control. A variety of control methods, such as a PAM (pulse amplitude modulation) control method, and a PFM (pulse frequency modulation) control method, or a combination of these methods may preferably be used, for example.

Fourth Preferred Embodiment

Figure 9:
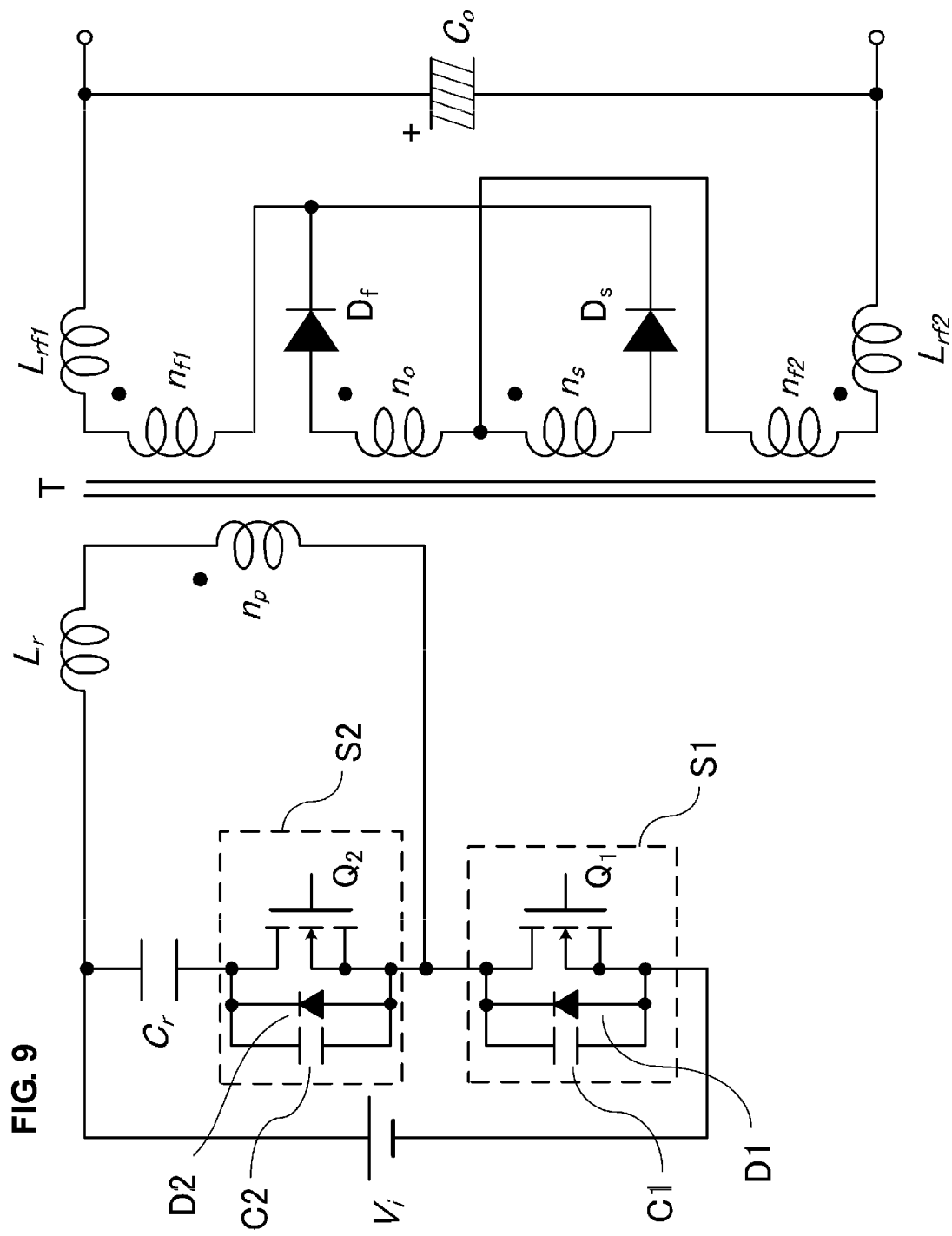
FIG. 9 is a circuit diagram of the isolated switching power supply apparatus of a fourth preferred embodiment of the present invention.

FIG. 9 is a circuit diagram of the isolated switching power supply apparatus according to a fourth preferred embodiment of the present invention. The isolated switching power supply apparatus according to the fourth preferred embodiment is different from the circuit illustrated in FIG. 7 in that a secondary side circuit illustrated in FIG. 9 is preferably a center-tap rectifying circuit, for example. More specifically, in FIG. 9, the first secondary winding ns and the fourth secondary winding no are preferably wound to have the same magnetic polarity, and include common ends connected together and the other ends connected to each other via the second diode Ds and the third diode Df, respectively. The second secondary winding nf1 preferably includes one end thereof connected to a high-voltage output terminal and the other end thereof connected to the cathodes of the second diode Ds and the third diode Df. The third secondary winding nf2 preferably includes one end connected to a low-voltage output terminal and the other end thereof connected to the common junction of the first secondary winding ns and the fourth secondary winding no.

With this arrangement, energy is transferred from the primary side to the secondary side during the on period of the first switching circuit S1 and the off period of the second switching circuit S2 and during the off period of the first switching circuit S1 and the on period of the second switching circuit S2.

The remainder of the fourth preferred embodiment is substantially the same as the isolated switching power supply apparatus illustrated in FIG. 7.

The fourth preferred embodiment including the above-described arrangement provides substantially the same operation and advantages as those of the first preferred embodiment of the present invention as described above.

Fifth Preferred Embodiment

Figure 10:
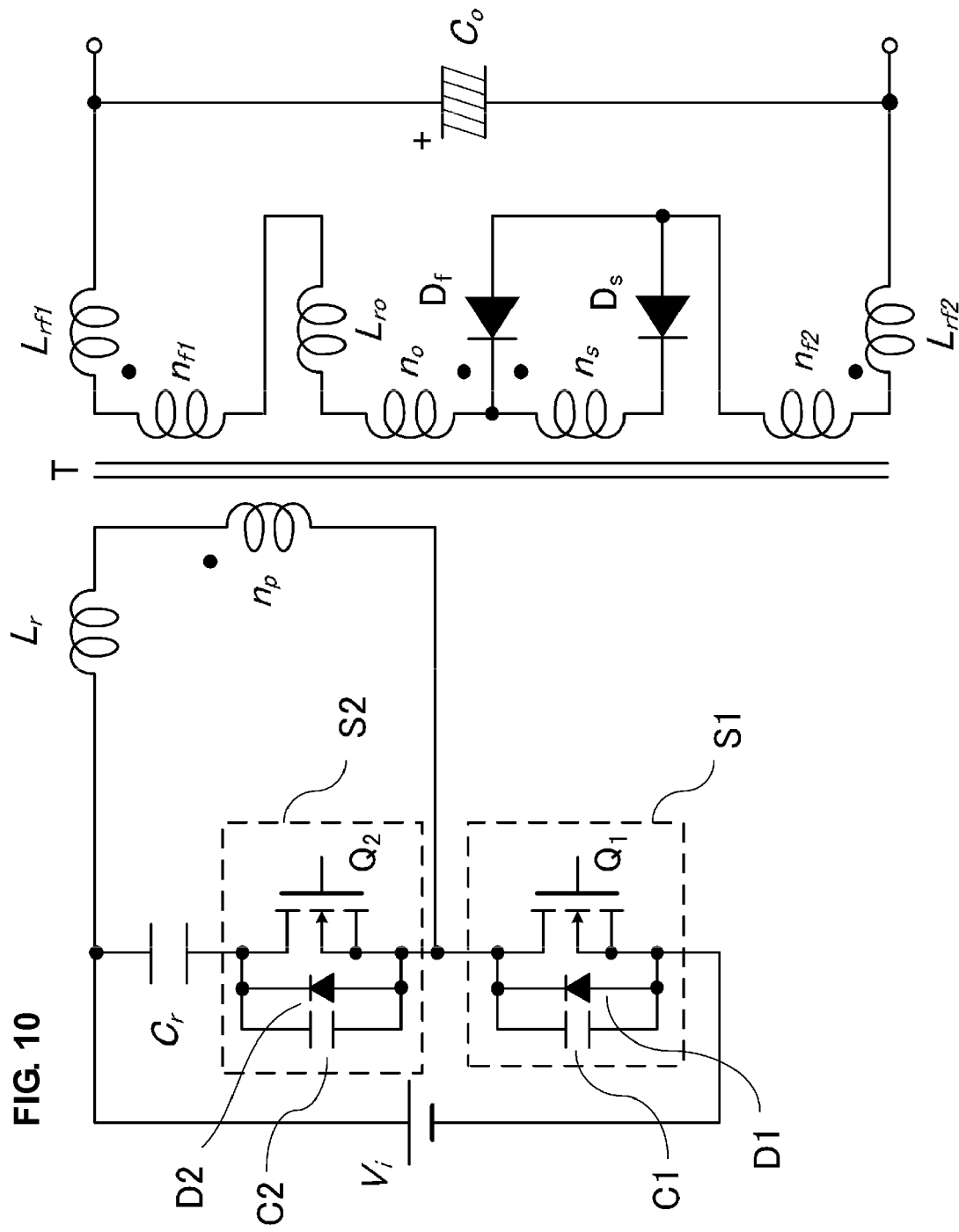
FIG. 10 is a circuit diagram of the isolated switching power supply apparatus of a fifth preferred embodiment of the present invention.

FIG. 10 is a circuit diagram of the isolated switching power supply apparatus according to a fifth preferred embodiment of the present invention. The isolated switching power supply apparatus of the fifth preferred embodiment is different from the circuit illustrated in FIG. 7 in the connection order of the second secondary winding nf1 and the third secondary winding nf2.

Referring to FIG. 10, the first secondary winding ns and the fourth secondary winding no are interposed between the second secondary winding nf1 and the third secondary winding nf2. The second secondary winding nf1 and the third secondary winding nf2 are respectively connected to the high-voltage output terminal and the low-voltage output terminal.

Figure 1A:
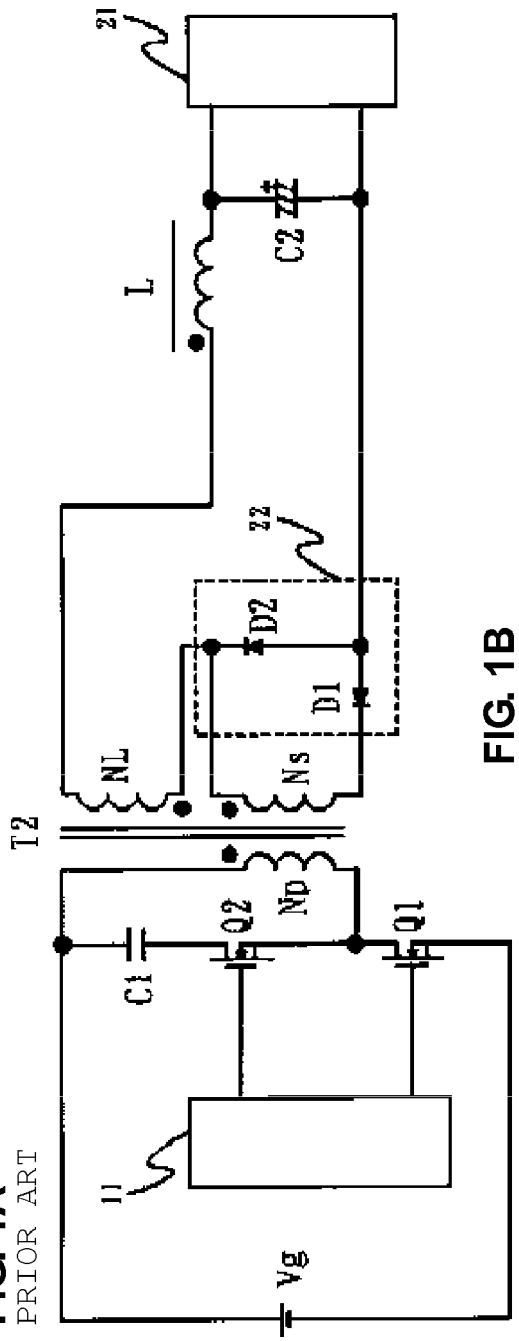
FIG. 1A is a circuit diagram of a known isolated switching power supply apparatus.
Figure 1B:
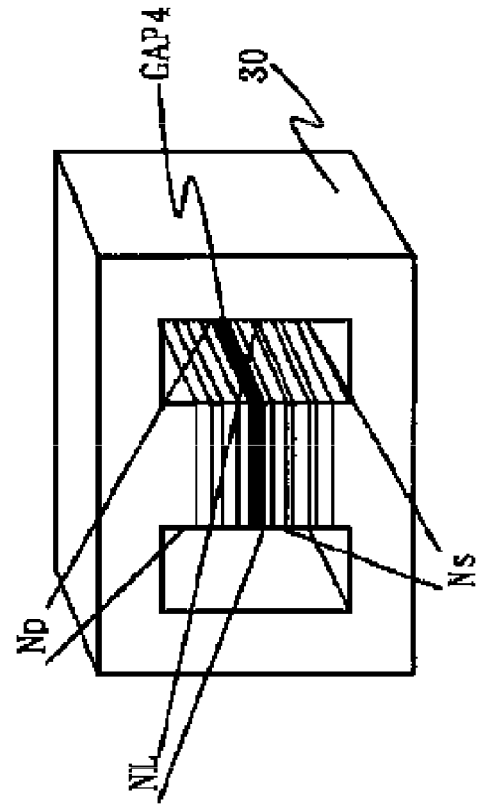
FIG. 1B shows a core of an isolated transformer of the switch power supply apparatus shown in FIG. 1A.
Figure 2:
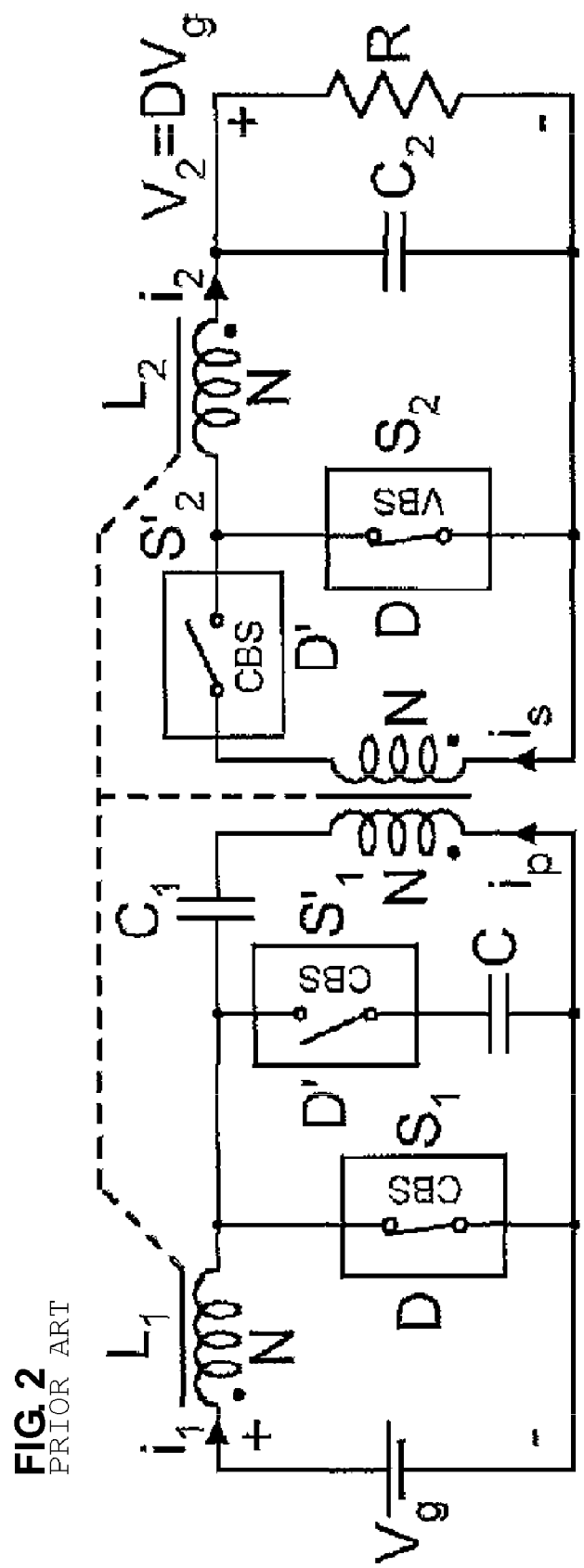
FIG. 2 is a circuit diagram of another known isolated switching power supply apparatus.
Figure 3:
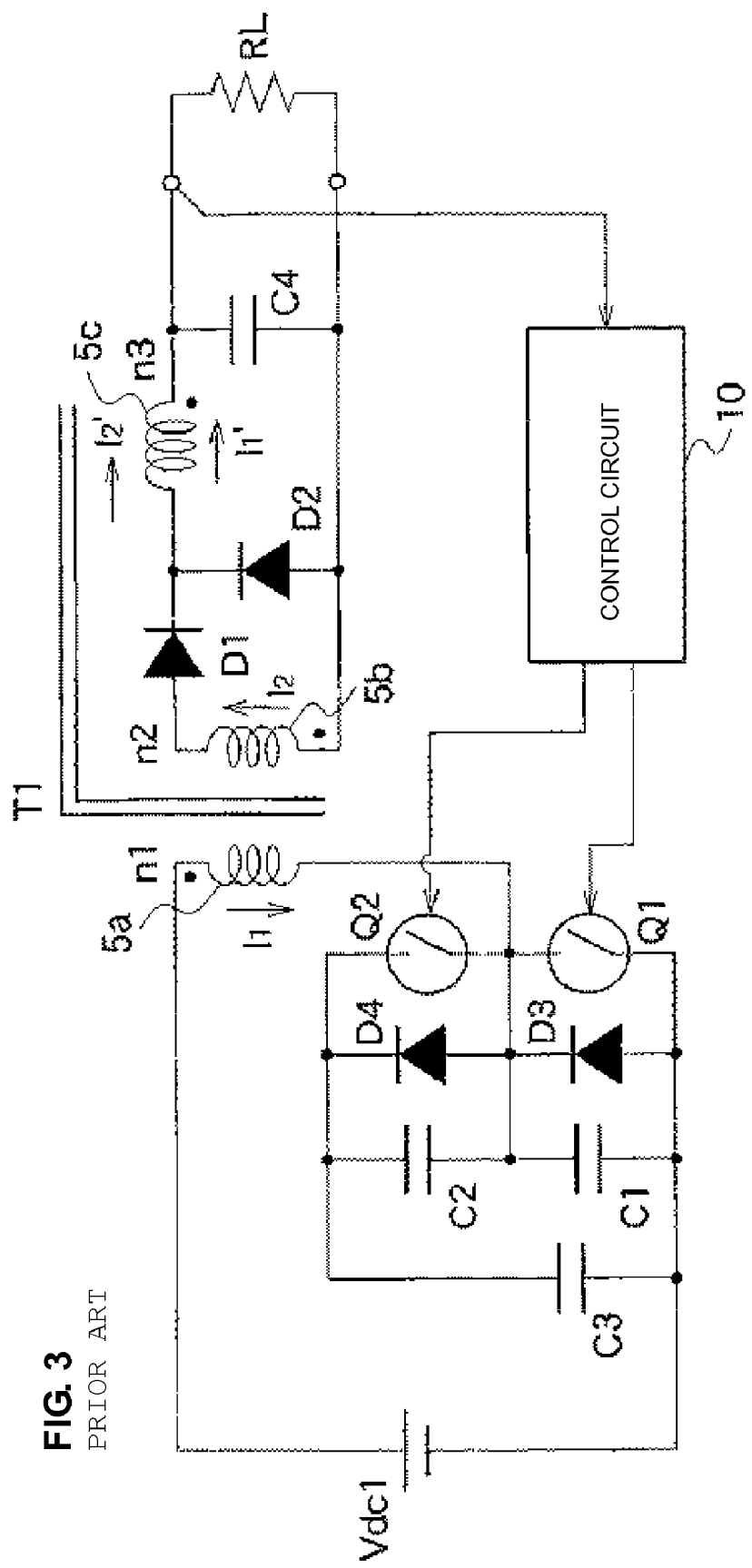
FIG. 3 is a circuit diagram of another isolated switching power supply apparatus.
Figure 4:
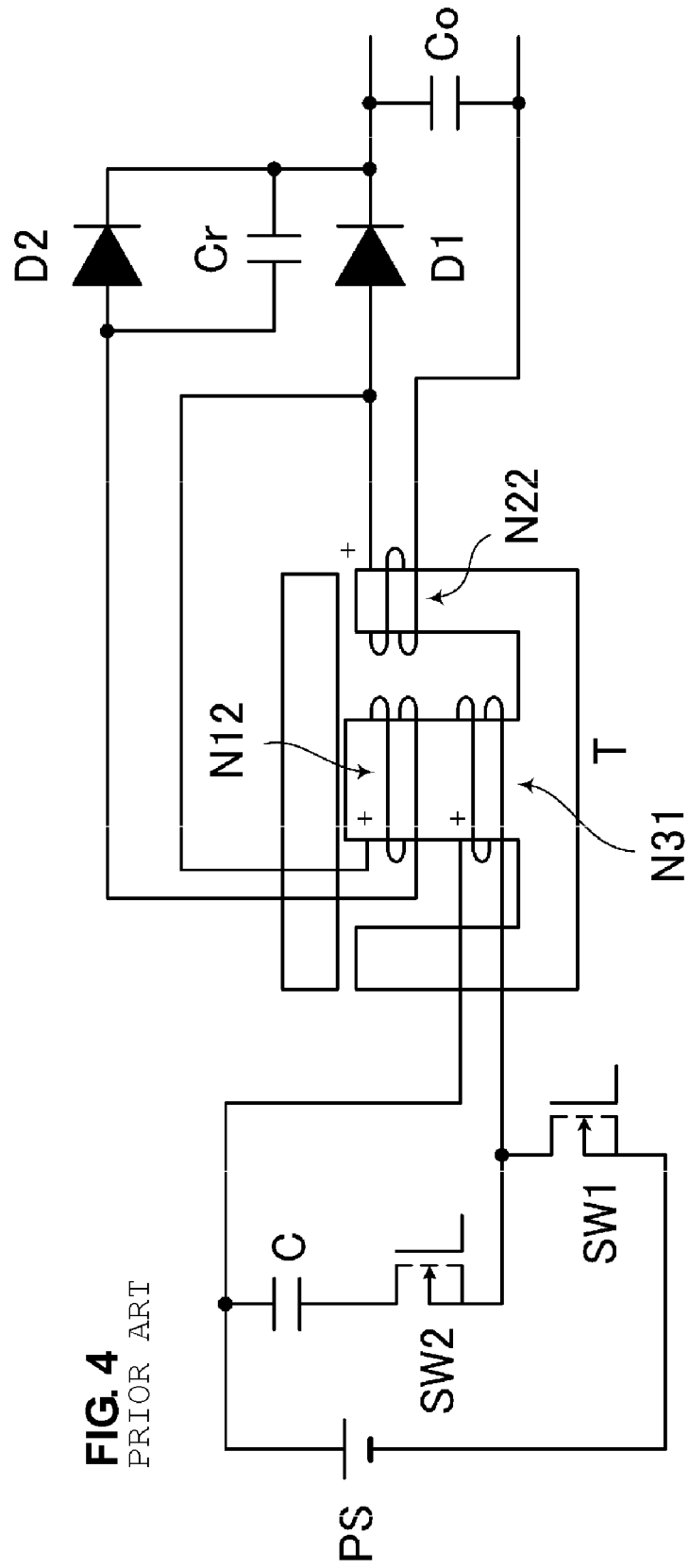
FIG. 4 is a circuit diagram of another known isolated switching power supply apparatus.

With this arrangement, common mode noise robustness is increased. The remainder of the fifth preferred embodiment is substantially the same as the isolated switching power supply apparatus illustrated in FIG. 3. The isolated switching power supply apparatus according to the fifth preferred embodiment provides substantially the same operation and advantages as those of the first preferred embodiment of the present invention as described above.

Sixth Preferred Embodiment

Figure 11:
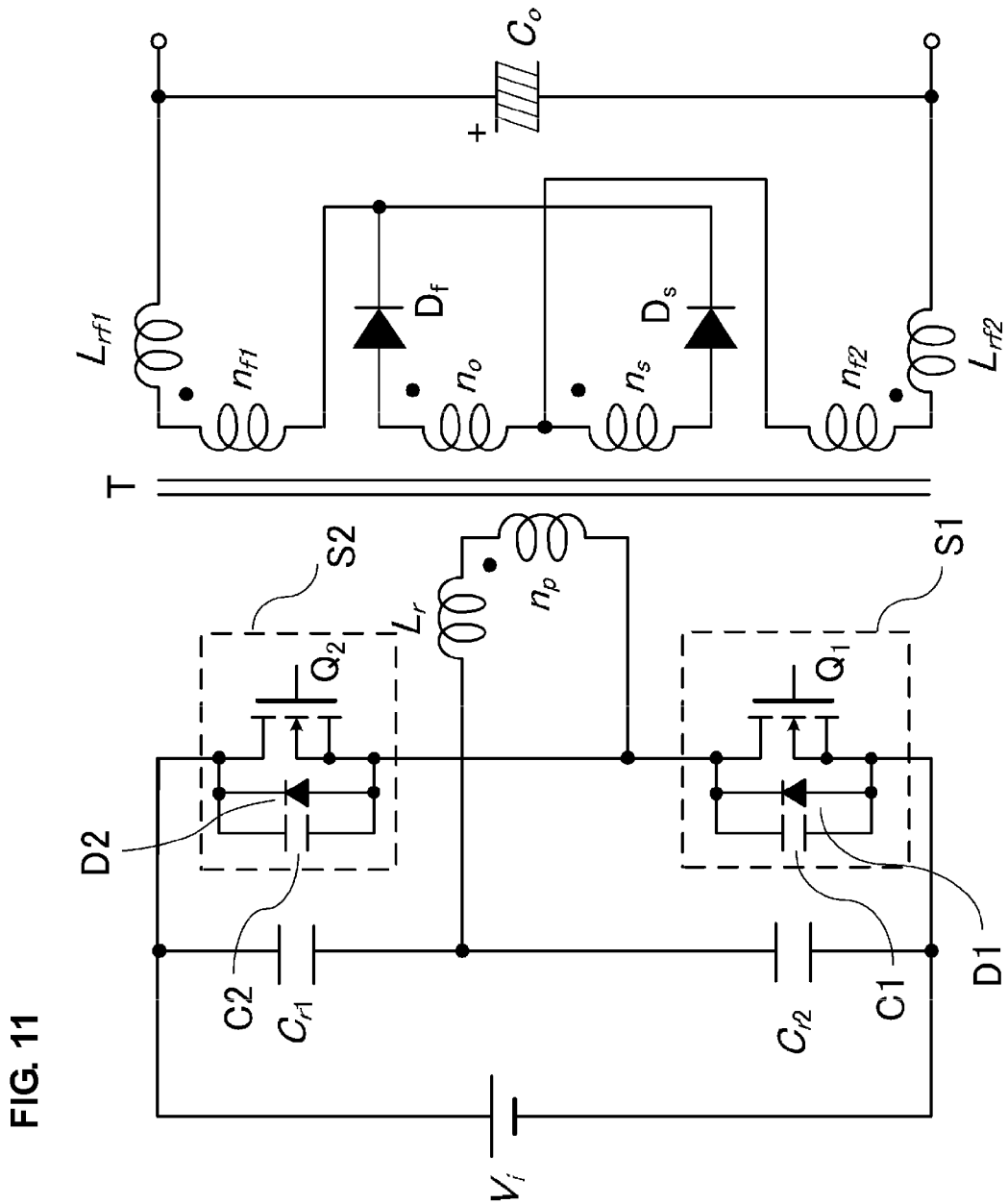
FIG. 11 is a circuit diagram of the isolated switching power supply apparatus of a sixth preferred embodiment of the present invention.

FIG. 11 is a circuit diagram of the isolated switching power supply apparatus according to a sixth preferred embodiment of the present invention.

The isolated switching power supply apparatus of the sixth preferred embodiment is different from the circuit illustrated in FIG. 9 in that the primary circuit thereof is preferably a half-bridge circuit, for example. More specifically, a series circuit including the first switching circuit S1 and the second switching circuit S2 and a series circuit including a sixth capacitor Cr1 and a seventh capacitor Cr2 are preferably connected in parallel with the direct-current input voltage Vi. The first primary winding np includes one end thereof connected to the junction of the first switching circuit S1 and the second switching circuit S2, and the other end thereof connected to the junction of the sixth capacitor Cr1 and the seventh capacitor Cr2. The remainder of the sixth preferred embodiment is substantially the same as the first preferred embodiment, and the explanation thereof is omitted here.

The isolated switching power supply apparatus according to the sixth preferred embodiment provides substantially the same operation and advantages as those of the first preferred embodiment of the present invention as described above.

Seventh Preferred Embodiment

Figure 12:
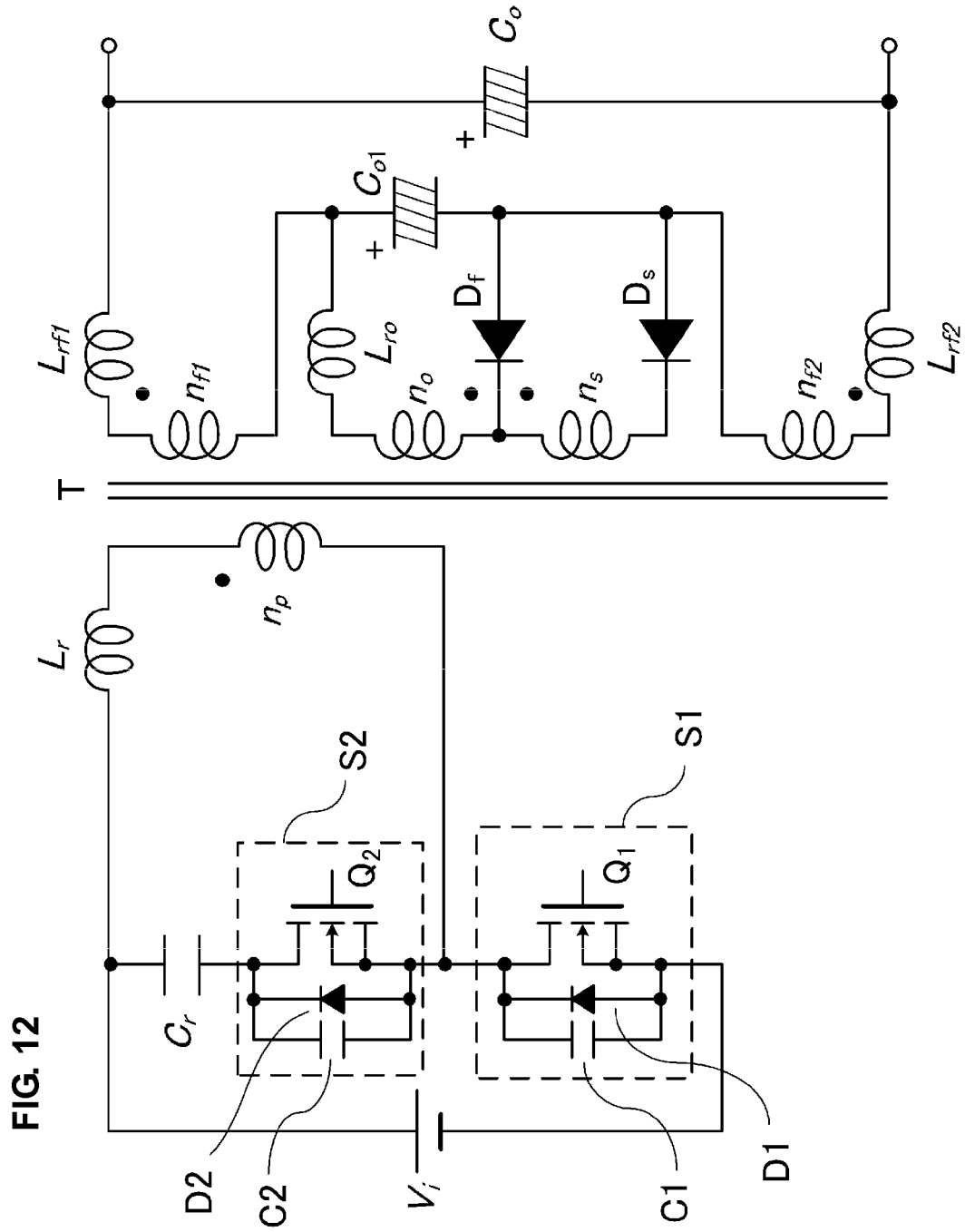
FIG. 12 is a circuit diagram of the isolated switching power supply apparatus of a seventh preferred embodiment of the present invention.

FIG. 12 is a circuit diagram of the isolated switching power supply apparatus according to a seventh preferred embodiment of the present invention. The isolated switching power supply apparatus illustrated in FIG. 12 is the circuit of the fifth preferred embodiment illustrated in FIG. 10 but including a third capacitor Co1 preferably connected between both terminals of the fourth secondary winding no. This arrangement further reduces the current ripple. The remainder of the seventh preferred embodiment is similar to the first preferred embodiment and the explanation thereof is omitted.

The seventh preferred embodiment provides substantially the same operation and advantages as those of the first preferred embodiment of the present invention as described above.

Eighth Preferred Embodiment

Figure 13:
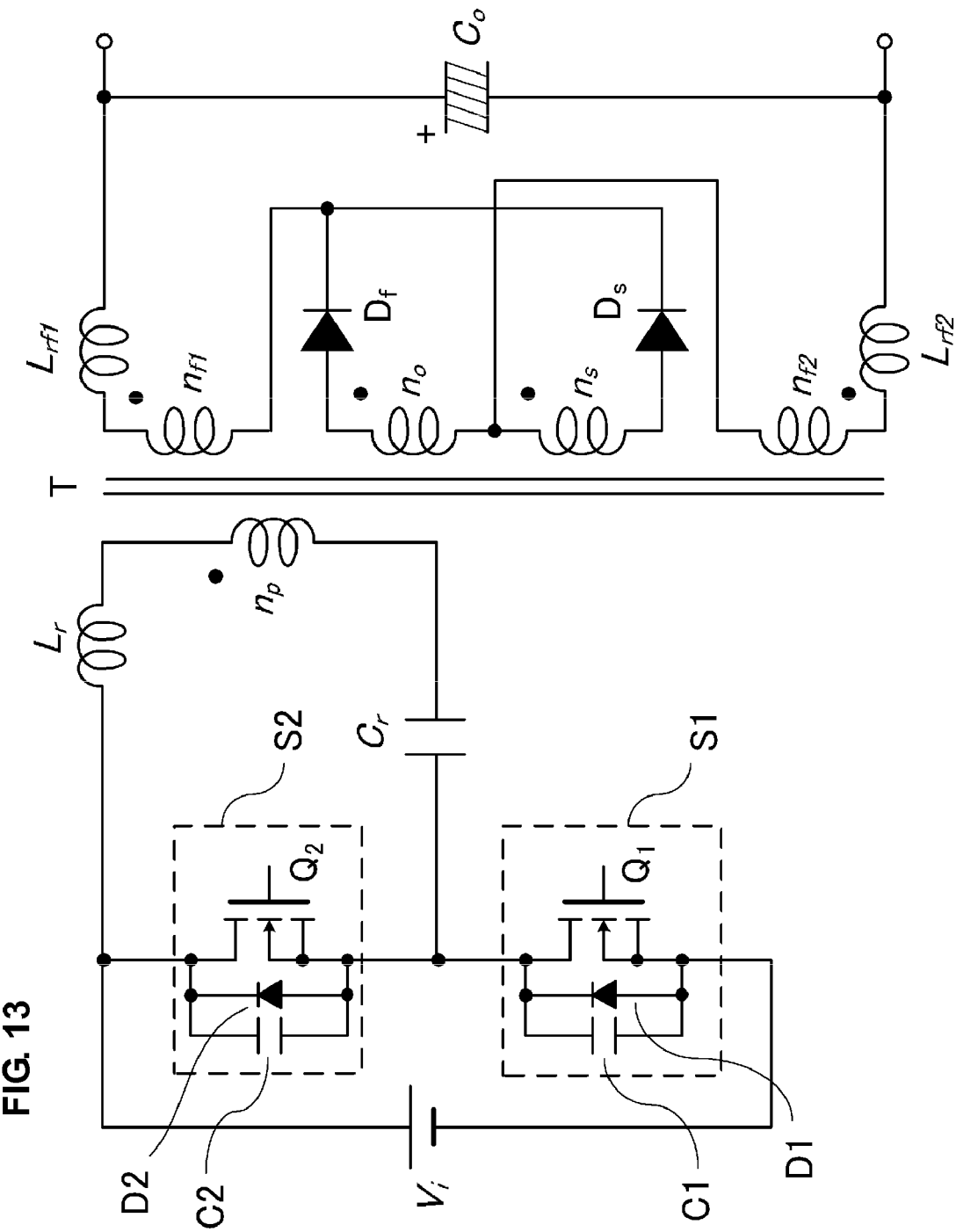
FIG. 13 is a circuit diagram of the isolated switching power supply apparatus of an eighth preferred embodiment of the present invention.

FIG. 13 is a circuit diagram of the isolated switching power supply apparatus according to an eighth preferred embodiment of the present invention.

The isolated switching power supply apparatus illustrated in FIG. 13 is different from the fourth preferred embodiment illustrated in FIG. 9 in the location of the fourth capacitor Cr. More specifically, as illustrated in FIG. 13, the second switching circuit S2 is preferably connected in parallel with a series circuit including the first primary winding np, the fourth capacitor Cr, and the first switching circuit S1. With this arrangement, the sum of a voltage across the first primary winding np and a voltage across the fourth capacitor Cr is substantially equal to the direct-current input voltage Vi, and a voltage applied across the first switching circuit S1 is set to be low. Withstand voltage of the switching element, such as MOSFET, for example, used in the first switching circuit S1 is set to be low. The isolated switching power supply apparatus is thus miniaturized. The remainder of the eighth preferred embodiment is similar to the first preferred embodiment, and the discussion thereof is omitted here.

The eighth preferred embodiment provides substantially the same operation and advantages as those of the first preferred embodiment of the present invention as described above.

Ninth Preferred Embodiment

Figure 14:
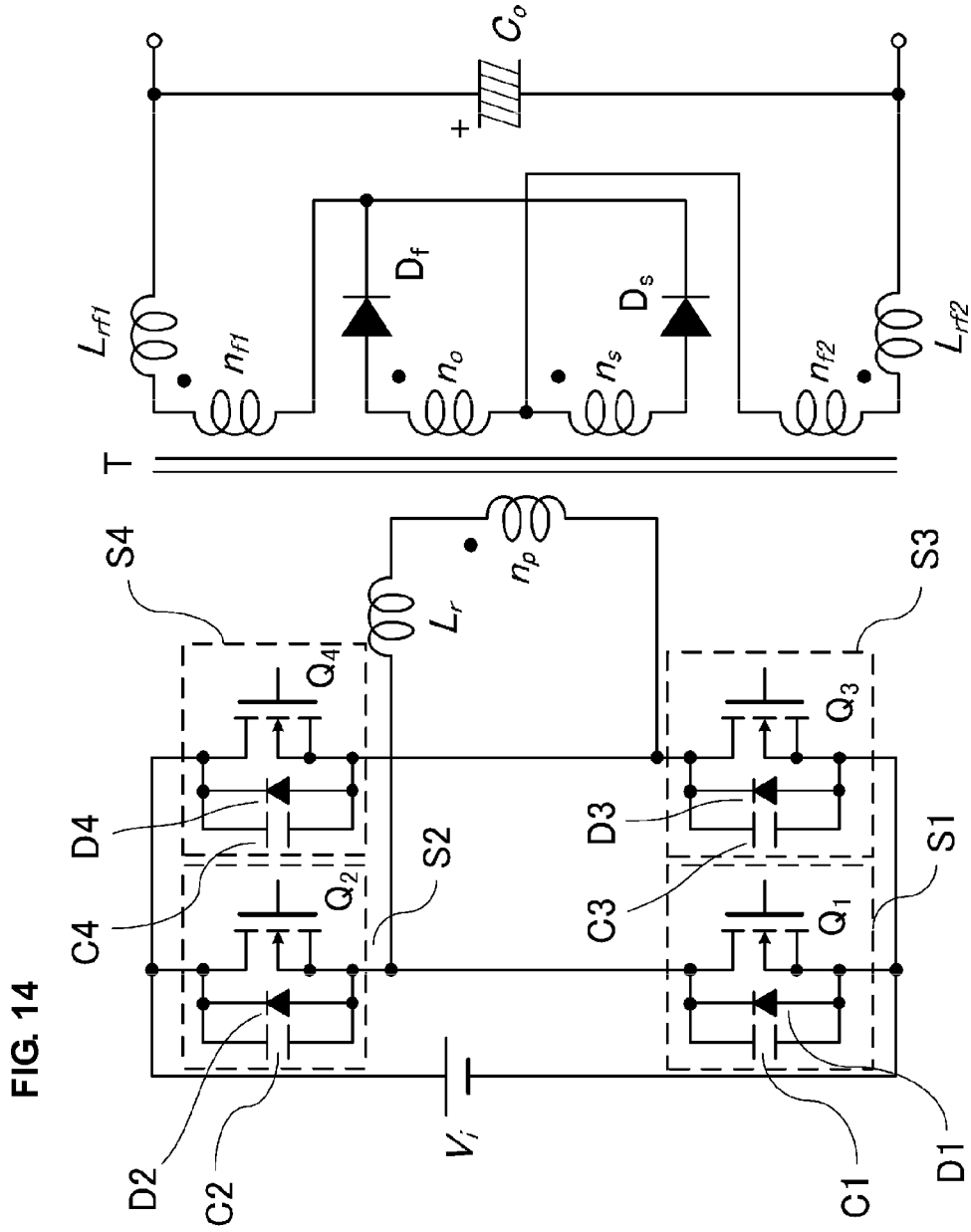
FIG. 14 is a circuit diagram of the isolated switching power supply apparatus of a ninth preferred embodiment of the present invention.

FIG. 14 is a circuit diagram of the isolated switching power supply apparatus according to a ninth preferred embodiment of the present invention.

The isolated switching power supply apparatus illustrated in FIG. 14 is different from the sixth preferred embodiment in that the primary side circuit is preferably a full-bridge circuit, rather than a half-bridge circuit. More specifically, the sixth capacitor Cr1 and the seventh capacitor Cr2 are preferably respectively replaced with a third switching circuit S3 and a fourth switching circuit S4, for example.

The remainder of the ninth preferred embodiment is similar to the sixth preferred embodiment, and the discussion thereof is omitted here.

The first switching circuit S1, the second switching circuit S2, the third switching circuit S3, and the fourth switching circuit S4 preferably include MOSFETs, for example.

The ninth preferred embodiment provides substantially the same operation and advantages as those of the first preferred embodiment of the present invention as described above.

Tenth Preferred Embodiment

Figure 15:
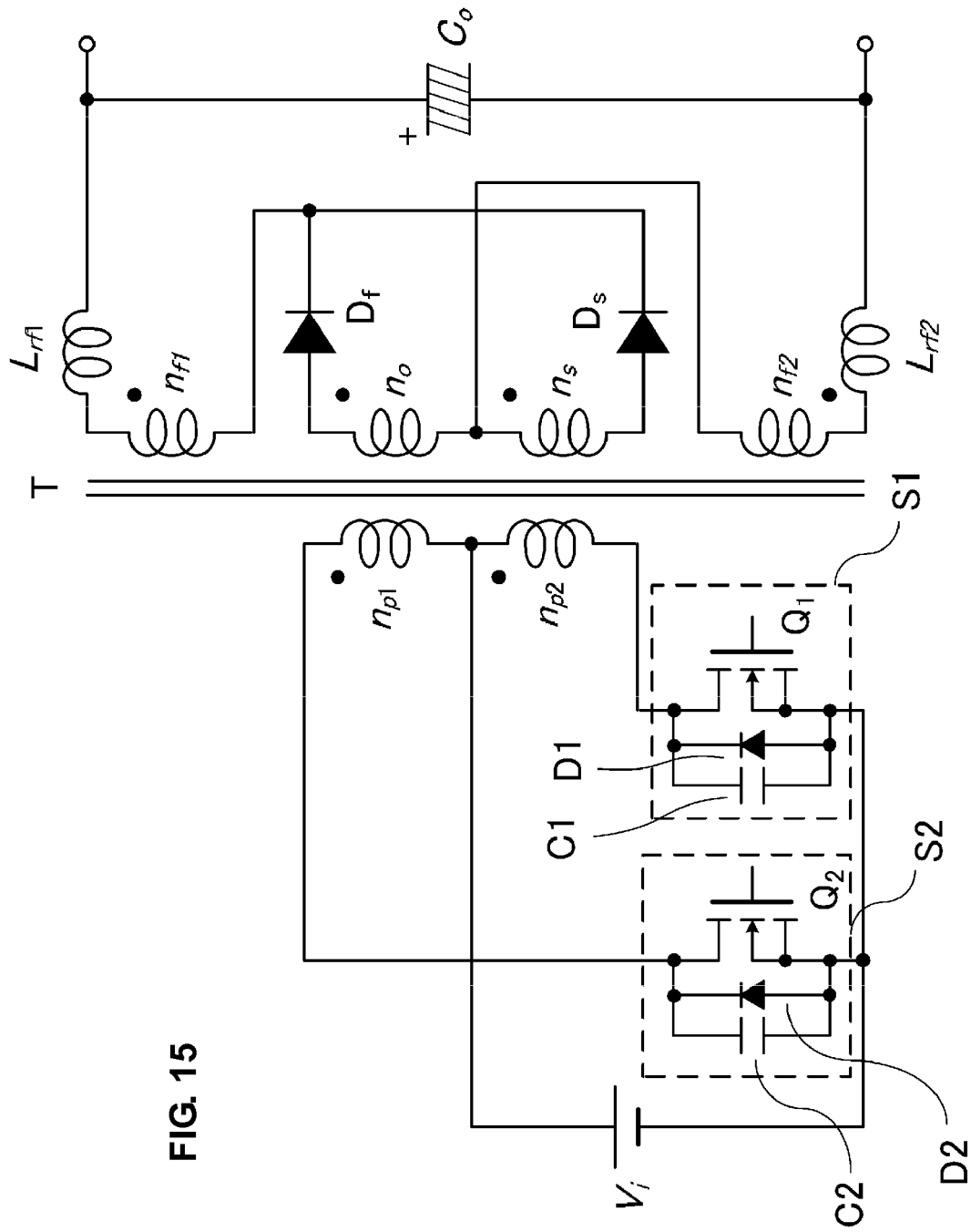
FIG. 15 is a circuit diagram of the isolated switching power supply apparatus of a tenth preferred embodiment of the present invention.

FIG. 15 is a circuit diagram of the isolated switching power supply apparatus according to a tenth preferred embodiment of the present invention.

The isolated switching power supply apparatus illustrated in FIG. 15 is different from the sixth preferred embodiment in that the primary side circuit is preferably a push-pull circuit rather than a half-bridge circuit. More specifically, as illustrated in FIG. 15, the primary winding of the compound transformer T preferably includes a second primary winding np1 and a third primary winding np2. Each of a series circuit including the second primary winding np1 and the second switching circuit S2 and a series circuit including the third primary winding np2 and the first switching circuit S1 is preferably connected in parallel with the direct-current input voltage Vi. The remainder of the tenth preferred embodiment is similar to the sixth preferred embodiment, and the discussion thereof is omitted here.

The tenth preferred embodiment provides substantially the same operation and advantages as those of the first preferred embodiment of the present invention as described above.

Eleventh Preferred Embodiment

Figure 16:
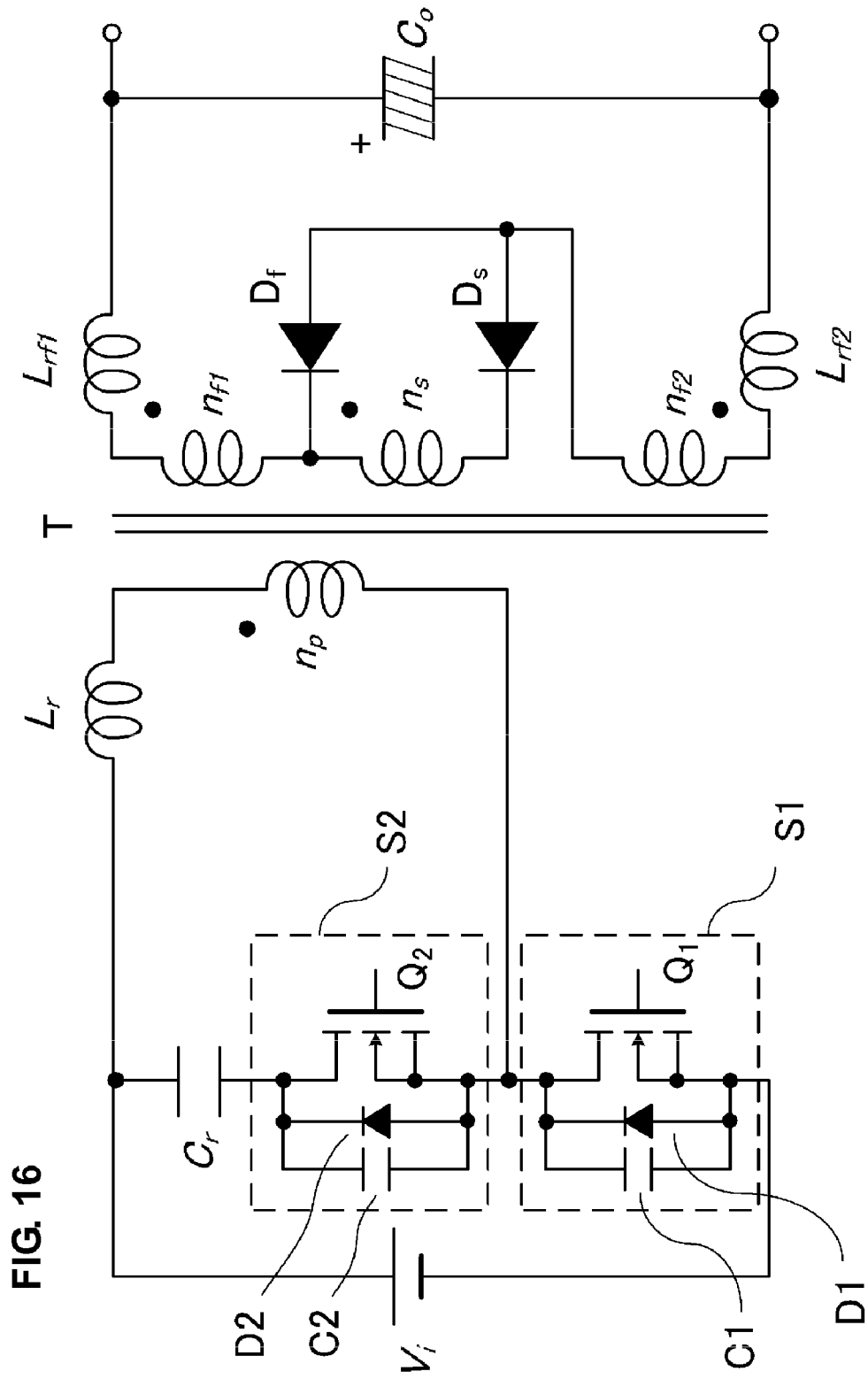
FIG. 16 is a circuit diagram of the isolated switching power supply apparatus of an eleventh preferred embodiment of the present invention.

FIG. 16 is a circuit diagram of the isolated switching power supply apparatus according to an eleventh preferred embodiment of the present invention.

The isolated switching power supply apparatus illustrated in FIG. 16 is similar in the primary side circuit to the third preferred embodiment illustrated in FIG. 7 and similar in the secondary side circuit to the first preferred embodiment illustrated in FIG. 5.

The eleventh preferred embodiment provides substantially the same operation and advantages as those of the first preferred embodiment of the present invention as described above.

Twelfth Preferred Embodiment

Figure 17:
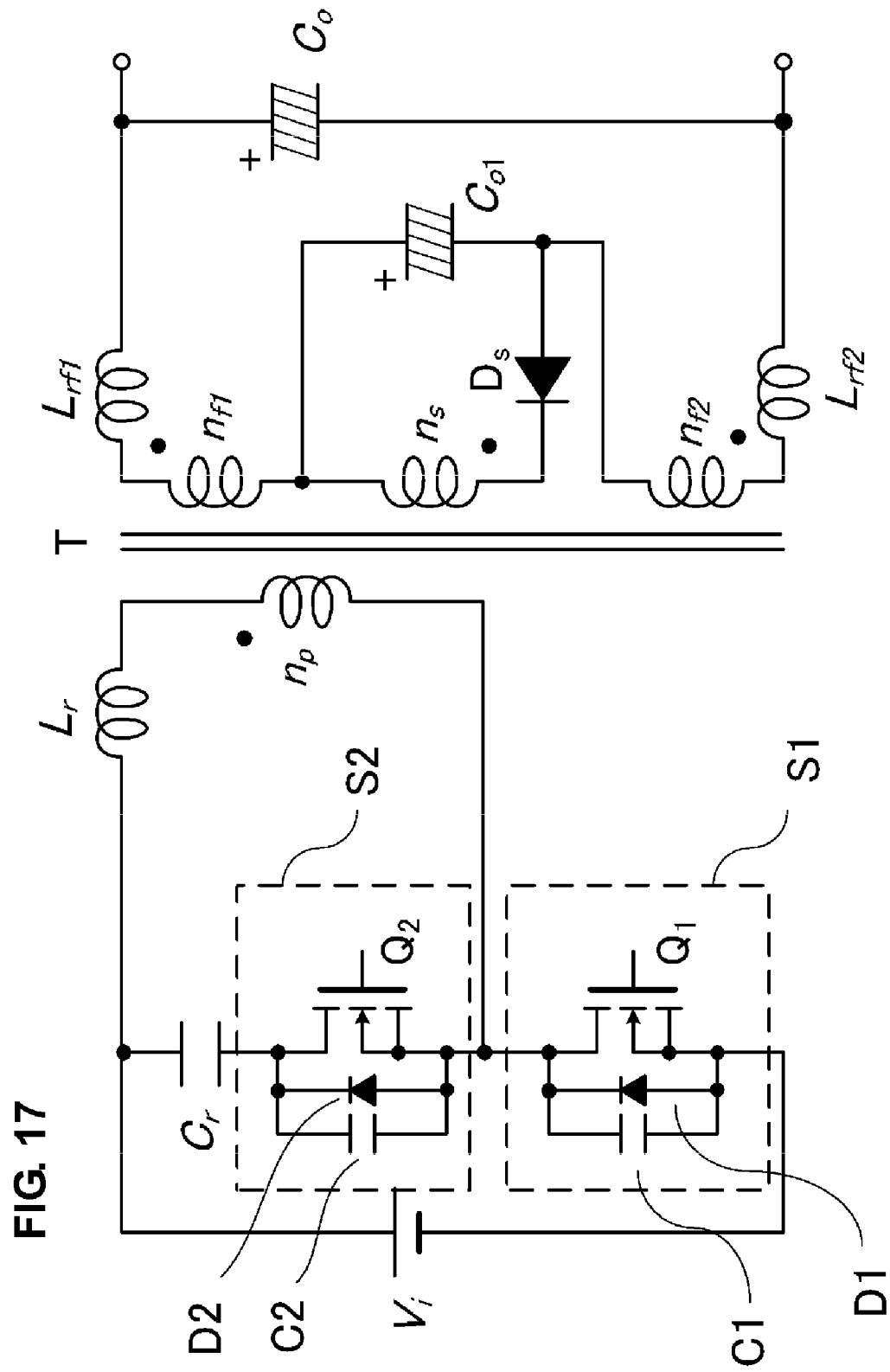
FIG. 17 is a circuit diagram of the isolated switching power supply apparatus of a twelfth preferred embodiment of the present invention.

FIG. 17 is a circuit diagram of the isolated switching power supply apparatus according to a twelfth preferred embodiment of the present invention.

The isolated switching power supply apparatus illustrated in FIG. 17 is similar in the primary side circuit to the third preferred embodiment illustrated in FIG. 7 and similar in the secondary side circuit to the second preferred embodiment illustrated in FIG. 6.

The twelfth preferred embodiment provides substantially the same operation and advantages as those of the first preferred embodiment of the present invention as described above.

Thirteenth Preferred Embodiment

Figure 18:
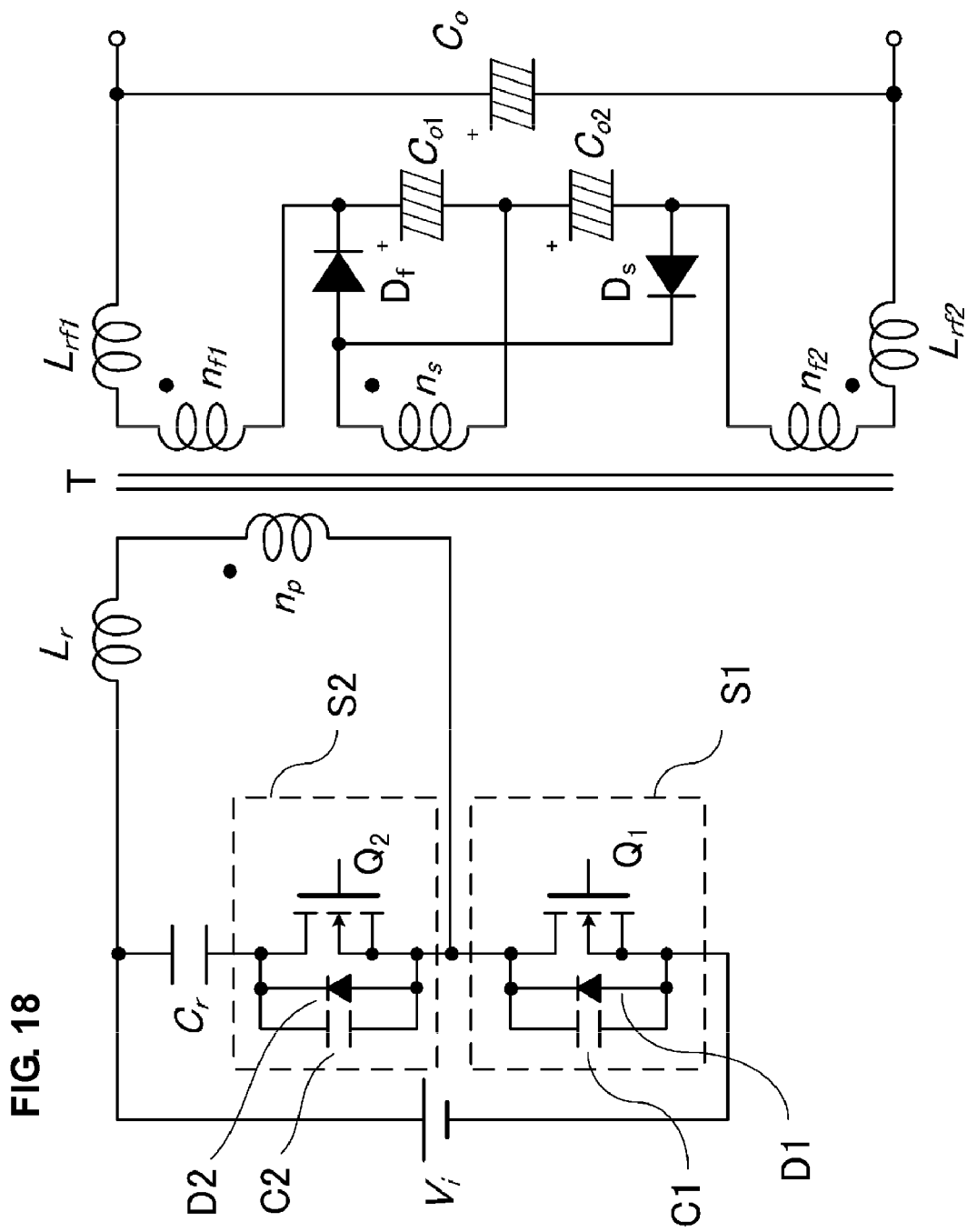
FIG. 18 is a circuit diagram of the isolated switching power supply apparatus of a thirteenth preferred embodiment of the present invention.

FIG. 18 is a circuit diagram of the isolated switching power supply apparatus according to a thirteenth preferred embodiment of the present invention.

The isolated switching power supply apparatus illustrated in FIG. 18 is different from the twelfth preferred embodiment illustrated in FIG. 17 in that the primary side circuit is preferably a voltage doubler rectifying circuit.

The thirteenth preferred embodiment provides substantially the same operation and advantages as those of the first preferred embodiment of the present invention as described above.

Fourteenth Preferred Embodiment

Figure 19:
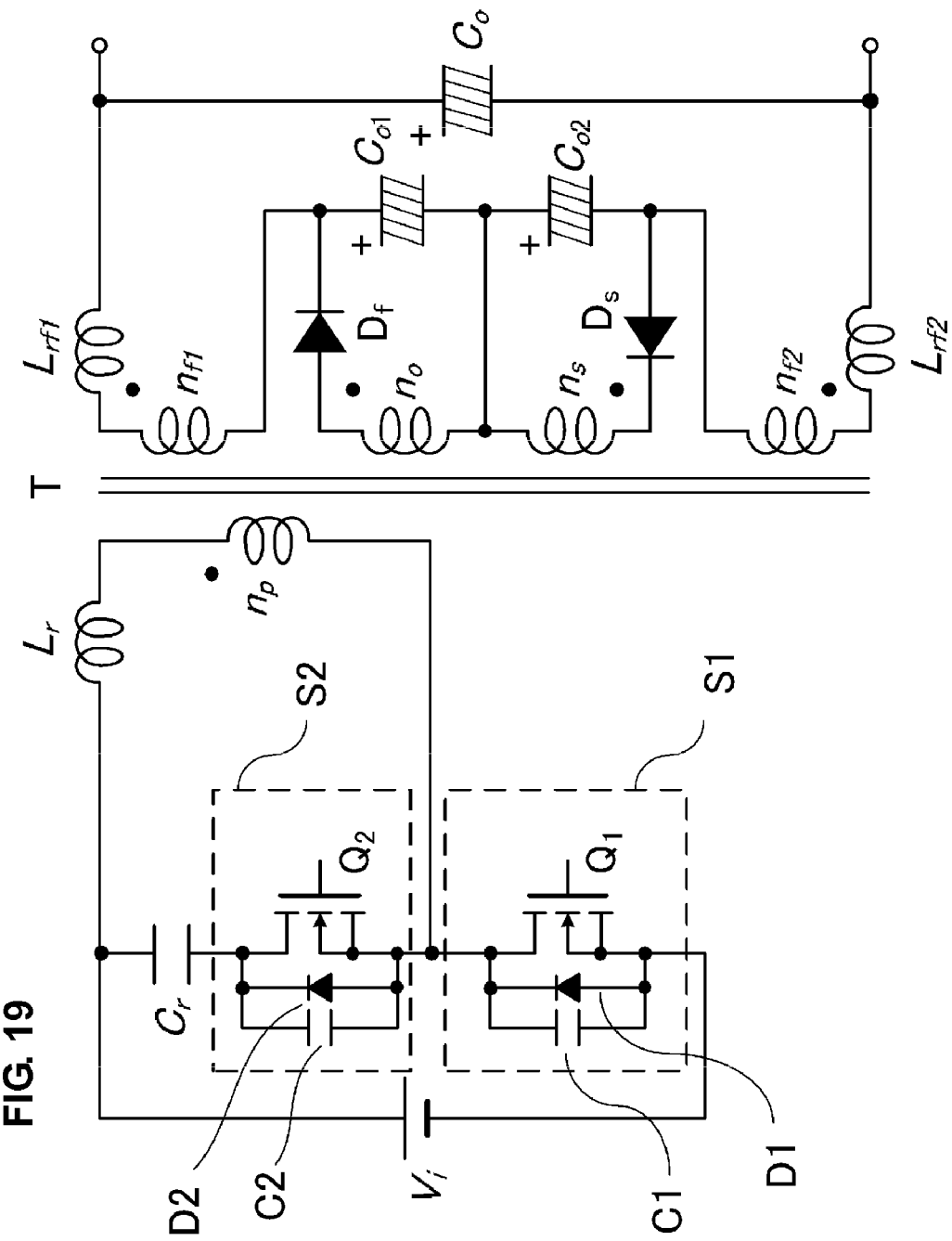
FIG. 19 is a circuit diagram of the isolated switching power supply apparatus of a fourteenth preferred embodiment of the present invention.

FIG. 19 is a circuit diagram of the isolated switching power supply apparatus according to a fourteenth preferred embodiment of the present invention.

The isolated switching power supply apparatus illustrated in FIG. 19 is similar to the thirteenth preferred embodiment illustrated in FIG. 18 in that a voltage doubler rectifying circuit is preferably provided, but different from the thirteenth preferred embodiment in that the fourth secondary winding no is preferably included in the compound transformer T with the junction of the third diode Df preferably connected to one end of the fourth secondary winding no.

The fourteenth preferred embodiment provides substantially the same operation and advantages as those of the first preferred embodiment of the present invention as described above.

Fifteenth Preferred Embodiment

Figure 20:
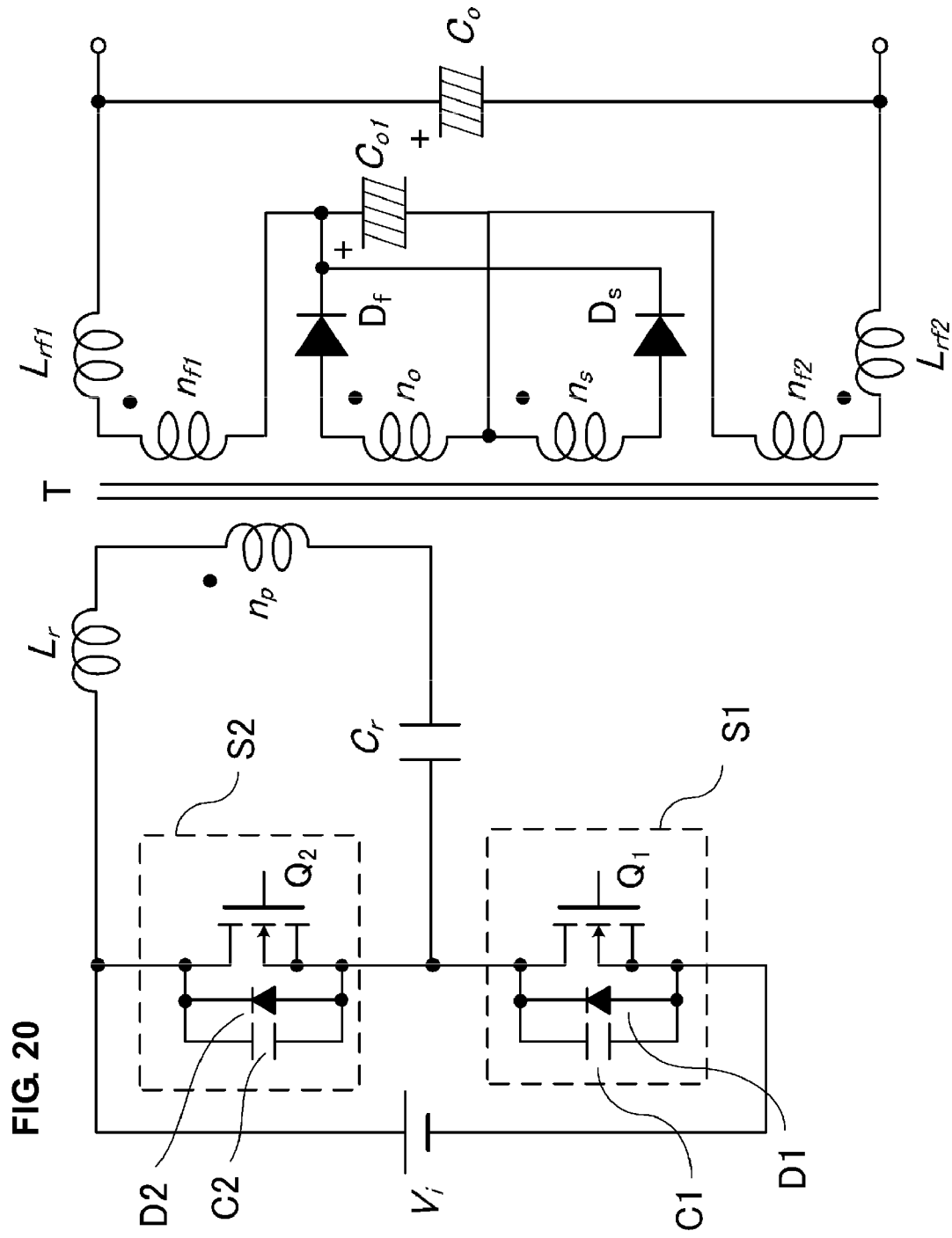
FIG. 20 is a circuit diagram of the isolated switching power supply apparatus of a fifteenth preferred embodiment of the present invention.

FIG. 20 is a circuit diagram of the isolated switching power supply apparatus according to a fifteenth preferred embodiment of the present invention.

The isolated switching power supply apparatus illustrated in FIG. 20 is similar in the primary side circuit to the eighth preferred embodiment illustrated in FIG. 13 and similar to the fourth preferred embodiment illustrated in FIG. 9 in that the secondary side circuit is preferably a center-tap rectifying circuit. The third capacitor Co1 is connected between both ends of the fourth secondary winding no so as to further reduce the current ripple.

The fifteen preferred embodiment provides substantially the same operation and advantages as those of the first preferred embodiment of the present invention as described above.

Sixteenth Preferred Embodiment

Figure 21:
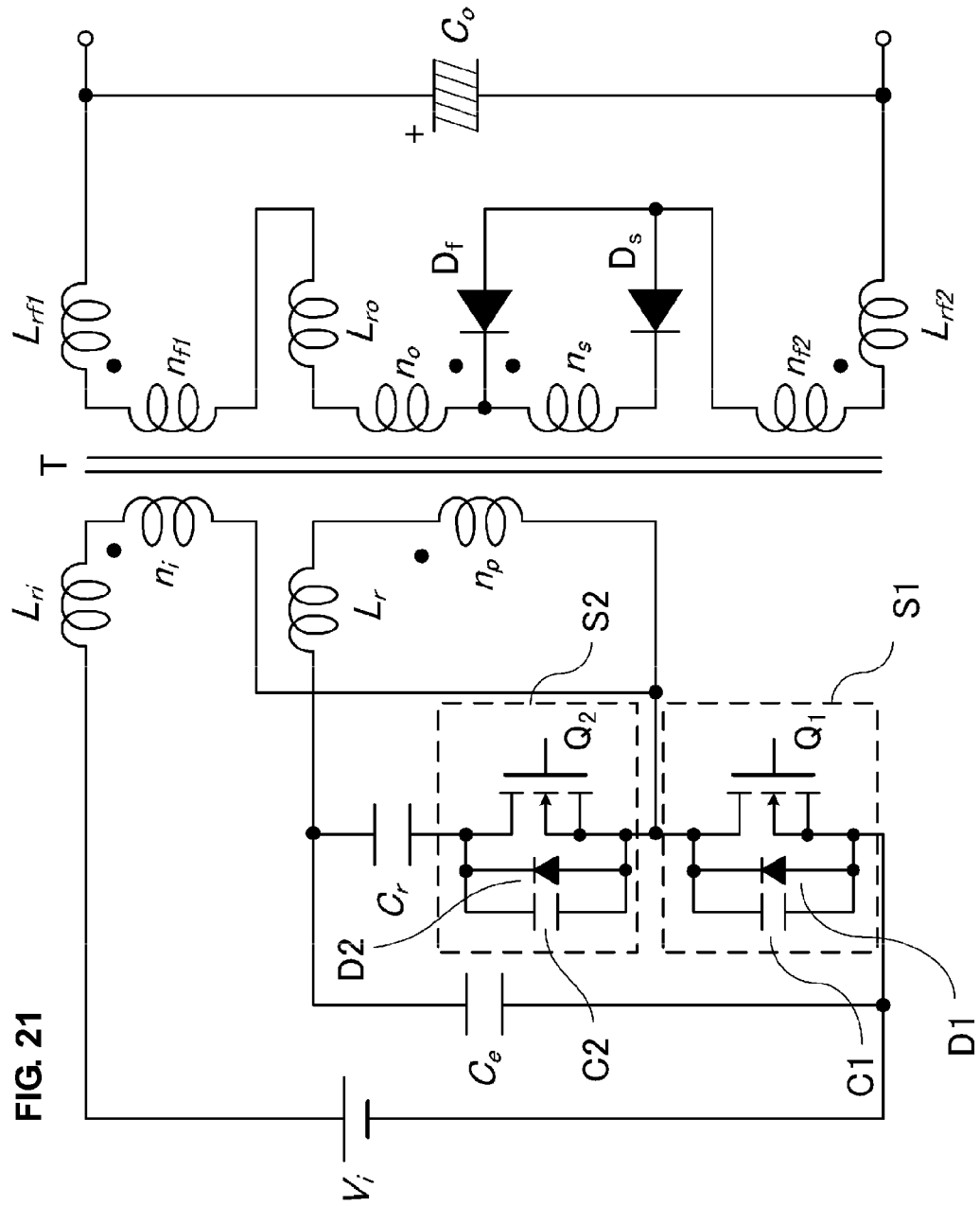
FIG. 21 is a circuit diagram of the isolated switching power supply apparatus of a sixteenth preferred embodiment of the present invention.

FIG. 21 is a circuit diagram of the isolated switching power supply apparatus according to a sixteenth preferred embodiment of the present invention.

The isolated switching power supply apparatus illustrated in FIG. 21 is similar to the fifth preferred embodiment illustrated in FIG. 10, but the fourth primary winding ni is preferably connected in parallel with the first primary winding np. More specifically, a series circuit including the third inductor Lr, the fourth primary winding ni, and the first switching circuit S1 is preferably connected between both ends of the direct-current input power supply Vi. A series circuit including the first primary winding np and the tenth capacitor Ce is preferably connected between the junction of the fourth primary winding ni and the first switching circuit S1 and one end of the direct-current input power supply Vi. A series circuit including the second switching circuit S2 and the fourth capacitor Cr is preferably connected in parallel with the first primary winding np.

The sixteenth preferred embodiment provides substantially the same operation and advantages as those of the first preferred embodiment of the present invention as described above.

Seventeenth Preferred Embodiment

Figure 22:
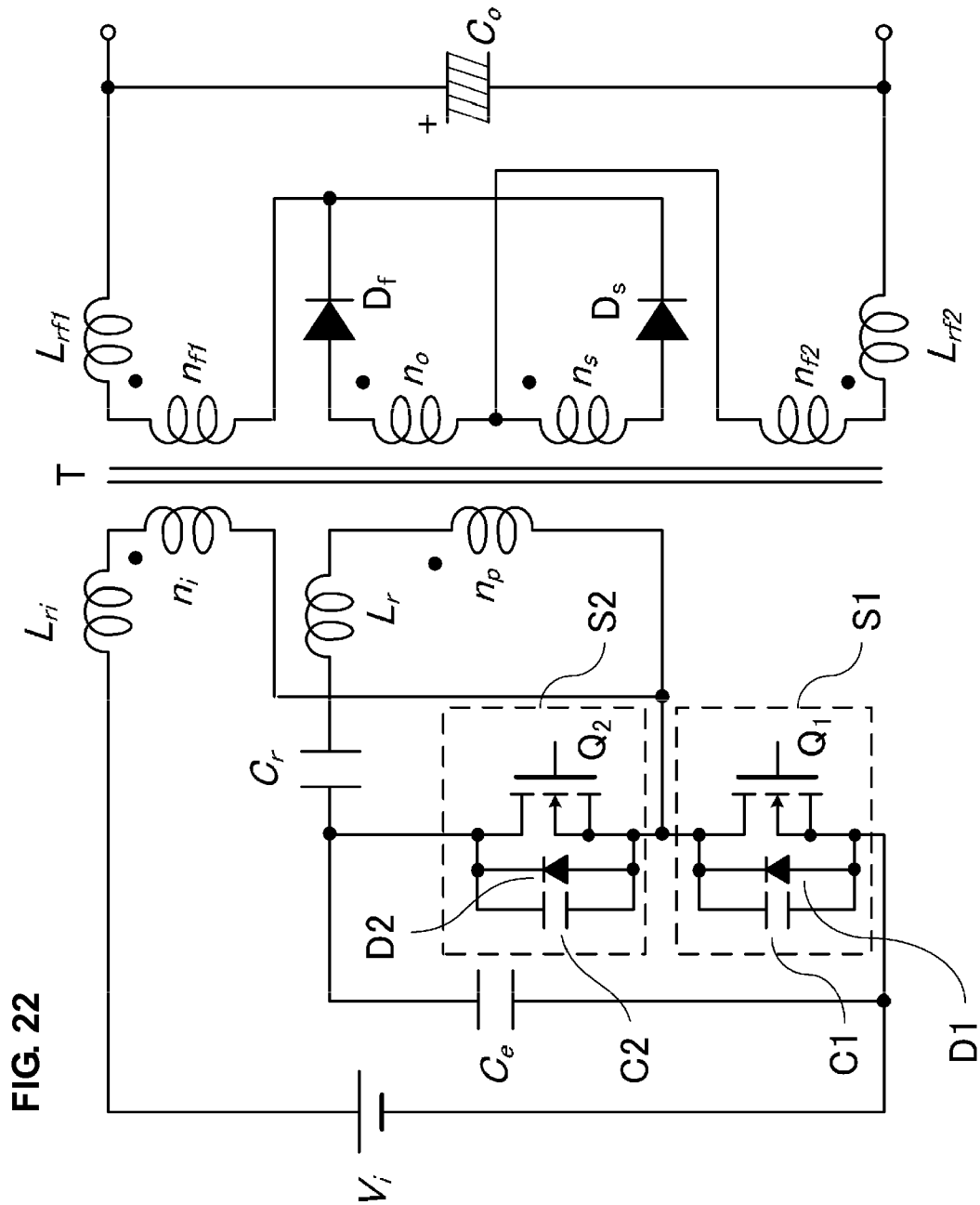
FIG. 22 is a circuit diagram of the isolated switching power supply apparatus of a seventeenth preferred embodiment of the present invention.

FIG. 22 is a circuit diagram of the isolated switching power supply apparatus according to a seventeenth preferred embodiment of the present invention.

The isolated switching power supply apparatus illustrated in FIG. 22 is different from the sixteenth preferred embodiment illustrated in FIG. 21 in the connection location of the fourth capacitor Cr2 in the primary side circuit. More specifically, the fourth capacitor Cr is preferably connected in series between the first primary winding np and the tenth capacitor Ce. The isolated switching power supply apparatus preferably includes a center-tap rectifying circuit in the secondary side circuit as the tenth preferred embodiment illustrated in FIG. 15.

The seventeenth preferred embodiment provides substantially the same operation and advantages as those of the first preferred embodiment of the present invention as described above.

Eighteenth Preferred Embodiment

Figure 23:
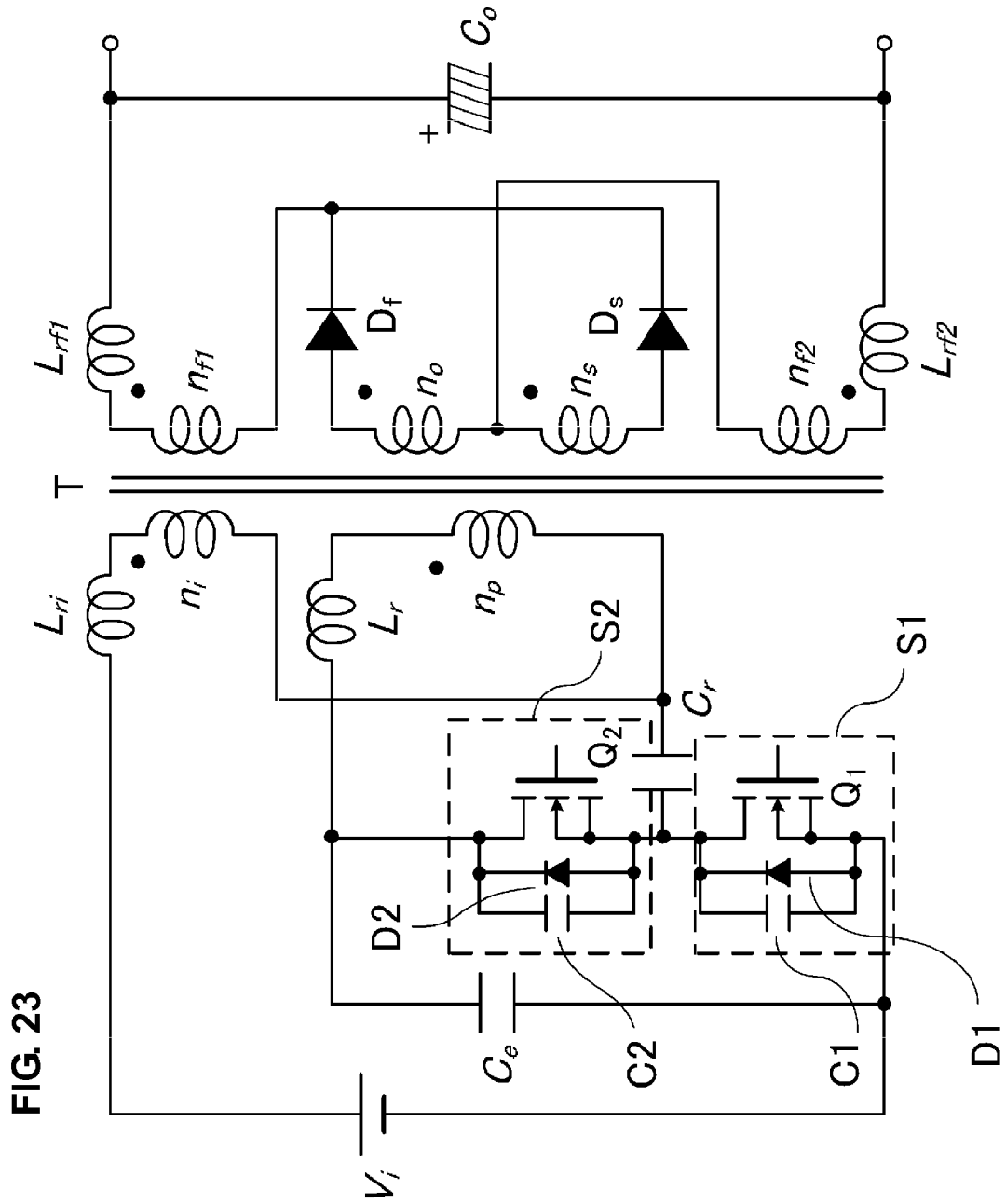
FIG. 23 is a circuit diagram of the isolated switching power supply apparatus of an eighteenth preferred embodiment of the present invention.

FIG. 23 is a circuit diagram of the isolated switching power supply apparatus according to an eighteenth preferred embodiment of the present invention.

The isolated switching power supply apparatus illustrated in FIG. 23 is different from the sixteenth preferred embodiment illustrated in FIG. 21 in the connection location of the fourth capacitor Cr2 in the primary side circuit. More specifically, the fourth capacitor Cr is preferably connected in series between the fourth primary winding ni and the first switching circuit S1. The isolated switching power supply apparatus preferably includes a center-tap rectifying circuit in the secondary side circuit as the tenth preferred embodiment illustrated in FIG. 15.

The eighteenth preferred embodiment provides substantially the same operation and advantages as those of the first preferred embodiment of the present invention as described above.

Nineteenth Preferred Embodiment

Figure 24:
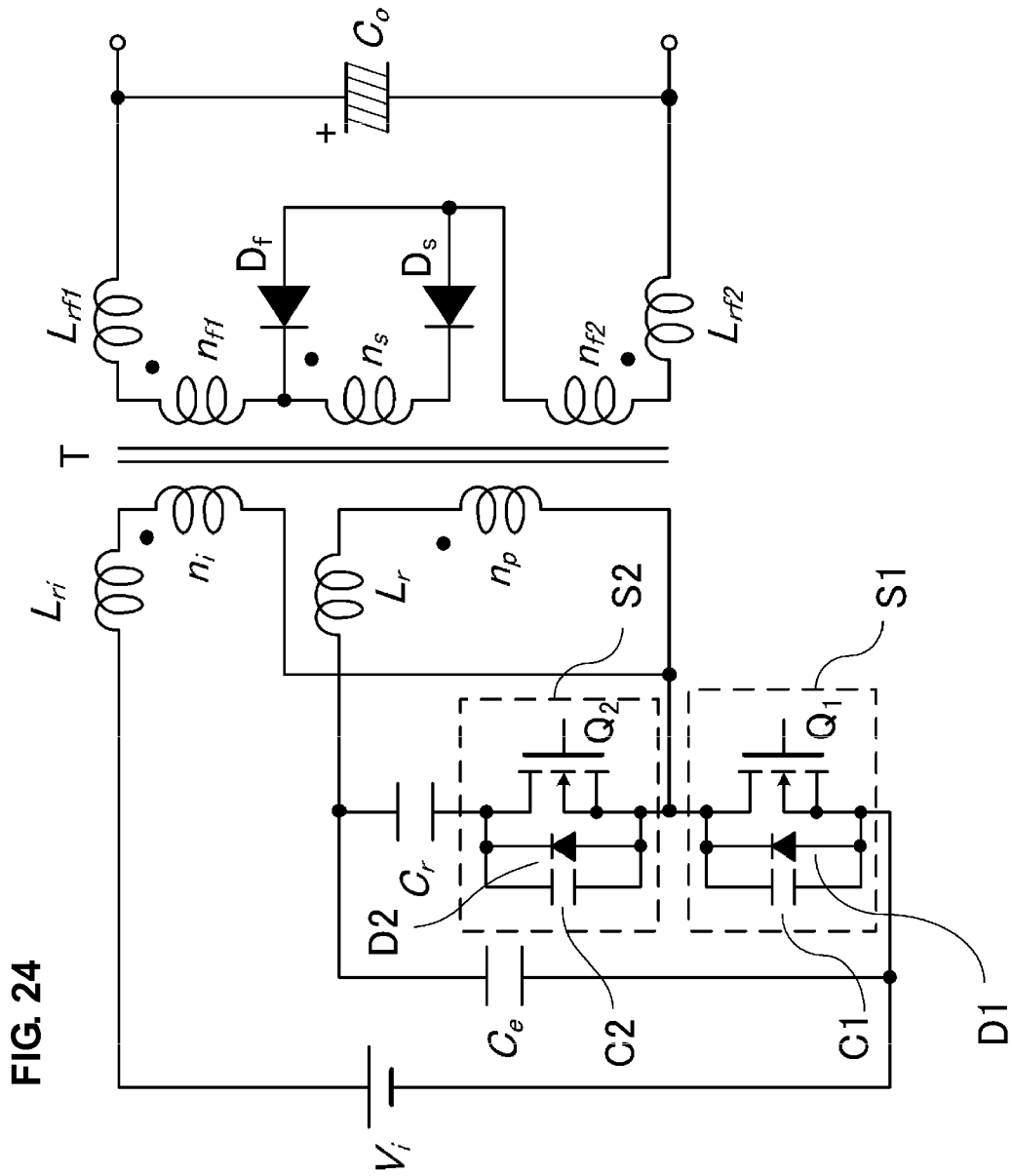
FIG. 24 is a circuit diagram of the isolated switching power supply apparatus of a nineteenth preferred embodiment of the present invention.

FIG. 24 is a circuit diagram of the isolated switching power supply apparatus according to a nineteenth preferred embodiment of the present invention.

The isolated switching power supply apparatus illustrated in FIG. 24 is similar in the primary side circuit to the sixteenth preferred embodiment illustrated in FIG. 21 and similar in the secondary side circuit to the eleventh preferred embodiment illustrated in FIG. 16.

The nineteenth preferred embodiment provides substantially the same operation and advantages as those of the first preferred embodiment of the present invention as described above.

Twentieth Preferred Embodiment

Figure 25:
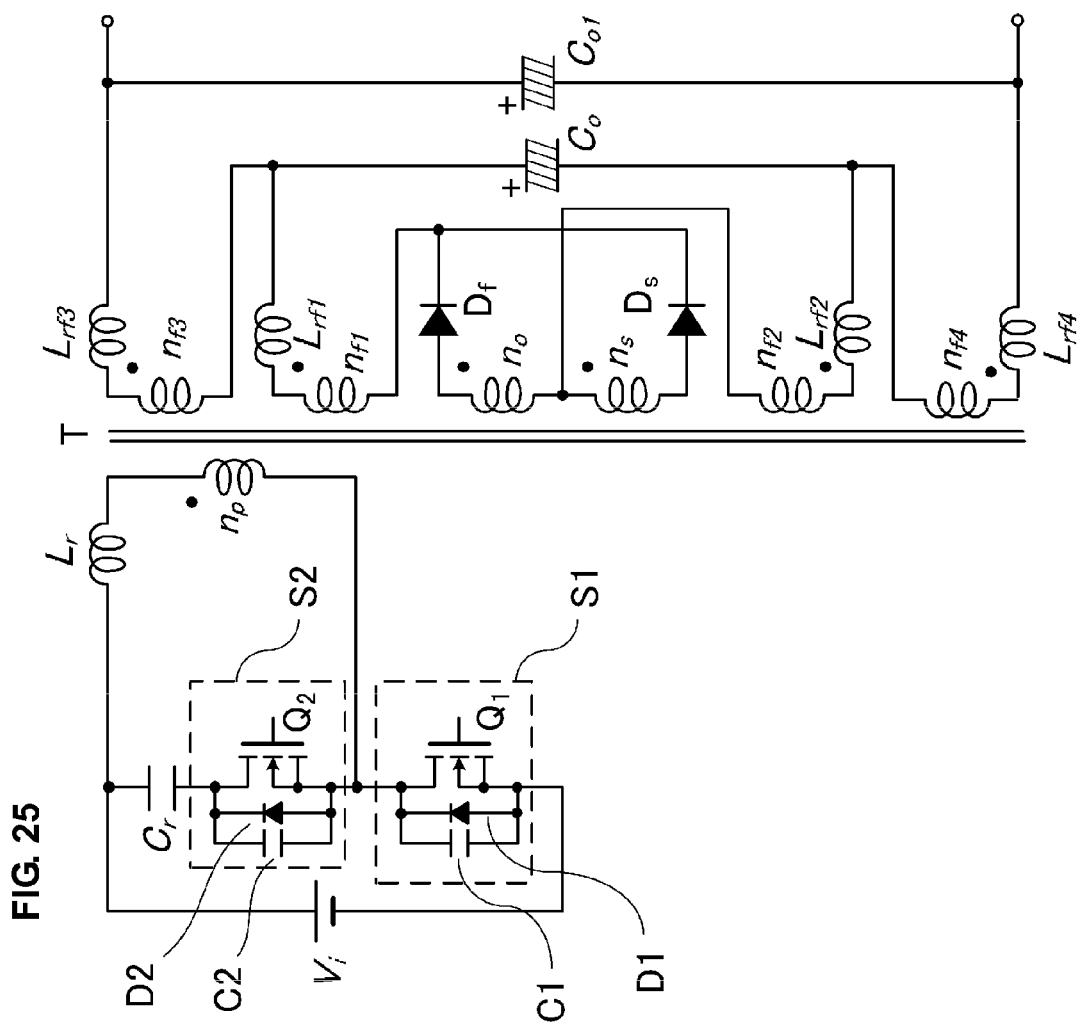
FIG. 25 is a circuit diagram of the isolated switching power supply apparatus of a twentieth preferred embodiment of the present invention.

FIG. 25 is a circuit diagram of the isolated switching power supply apparatus according to a twentieth preferred embodiment of the present invention.

The isolated switching power supply apparatus illustrated in FIG. 25 is similar in the primary side circuit to the fourth preferred embodiment illustrated in FIG. 9. In the secondary side circuit, the isolated switching power supply apparatus illustrated in FIG. 25 is different from the fourth preferred embodiment illustrated in FIG. 9 in that a fifth secondary winding nf3 is preferably connected in series with the high-voltage side of the second secondary winding nf1 and that a sixth secondary winding nf4 is preferably connected in series with the low-voltage side of the third secondary winding nf2. The second capacitor Co is preferably connected between the high-voltage terminal of the fifth secondary winding nf3 and the low-voltage terminal of the sixth secondary winding nf4. The third capacitor Co1 is preferably connected between the high-voltage terminal of the second secondary winding nf1 and the low-voltage terminal of the third secondary winding nf2. With this arrangement, two stages of low-pass filter are provided, which further reduces ripple current.

The twentieth preferred embodiment provides substantially the same operation and advantages as those of the first preferred embodiment of the present invention as described above.

Twenty-First Preferred Embodiment

Figure 26:
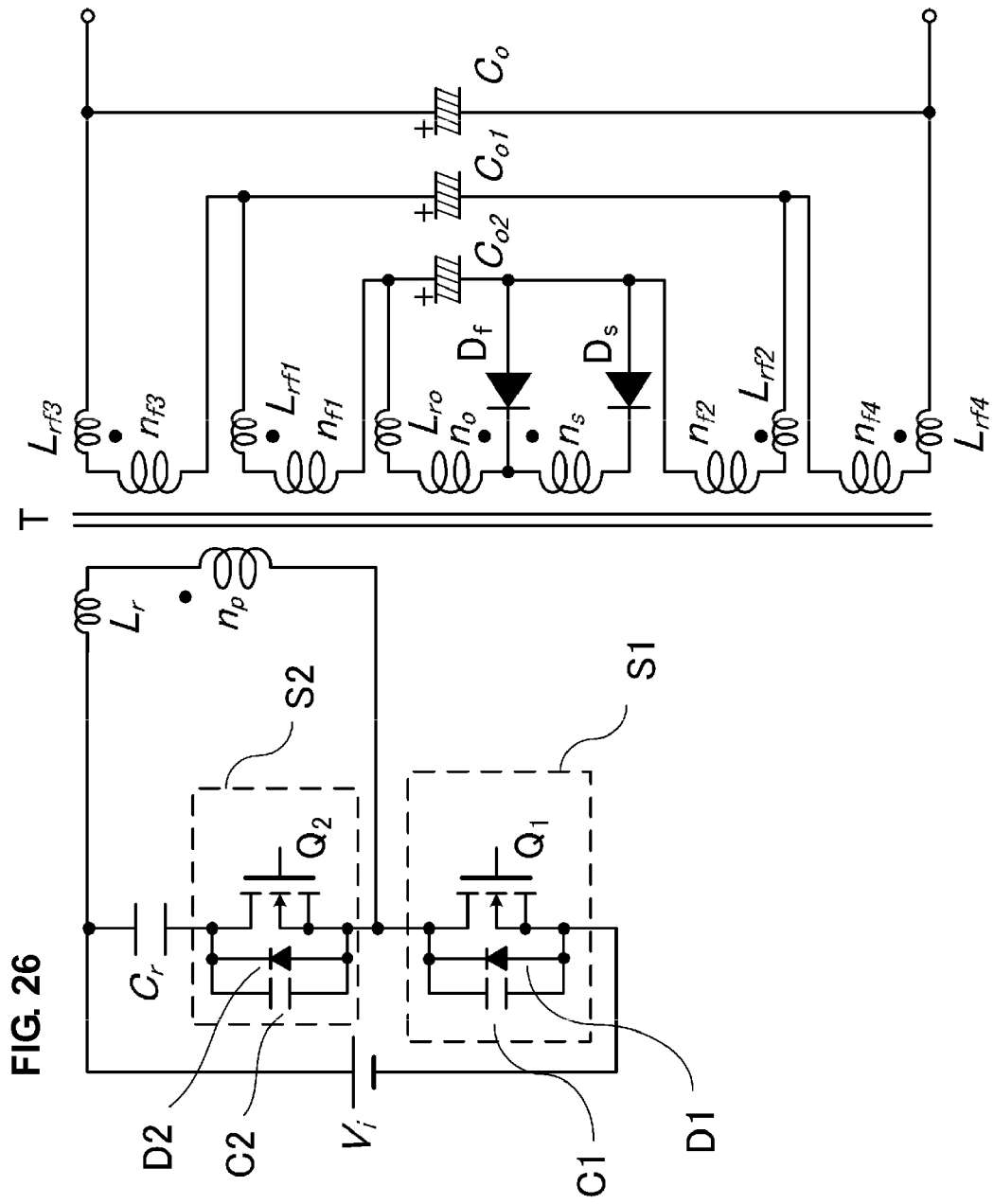
FIG. 26 is a circuit diagram of the isolated switching power supply apparatus of a twenty-first preferred embodiment of the present invention.

FIG. 26 is a circuit diagram of the isolated switching power supply apparatus according to a twenty-first preferred embodiment of the present invention.

The isolated switching power supply apparatus illustrated in FIG. 26 is similar in the primary side circuit to the fifth preferred embodiment illustrated in FIG. 10. In the secondary side circuit, the isolated switching power supply apparatus illustrated in FIG. 26 is different from the fifth preferred embodiment illustrated in FIG. 10 in that the fifth secondary winding nf3 is preferably connected in series with the high-voltage side of the second secondary winding nf1 and that the sixth secondary winding nf4 is connected in series with the low-voltage side of the third secondary winding nf2. The second capacitor Co is preferably connected between the high-voltage terminal of the fifth secondary winding nf3 and the low-voltage terminal of the sixth secondary winding nf4. An eleventh capacitor Ce is preferably connected between the high-voltage terminal of the second secondary winding nf1 and the low-voltage terminal of the third secondary winding nf2. The third capacitor Co1 is preferably connected to both ends of the fourth secondary winding no. With this arrangement, three stages of low-pass filter are provided, which further reduces ripple current.

The twenty-first preferred embodiment provides substantially the same operation and advantages as those of the first preferred embodiment of the present invention as described above.

Twenty-Second Preferred Embodiment

Figure 27:
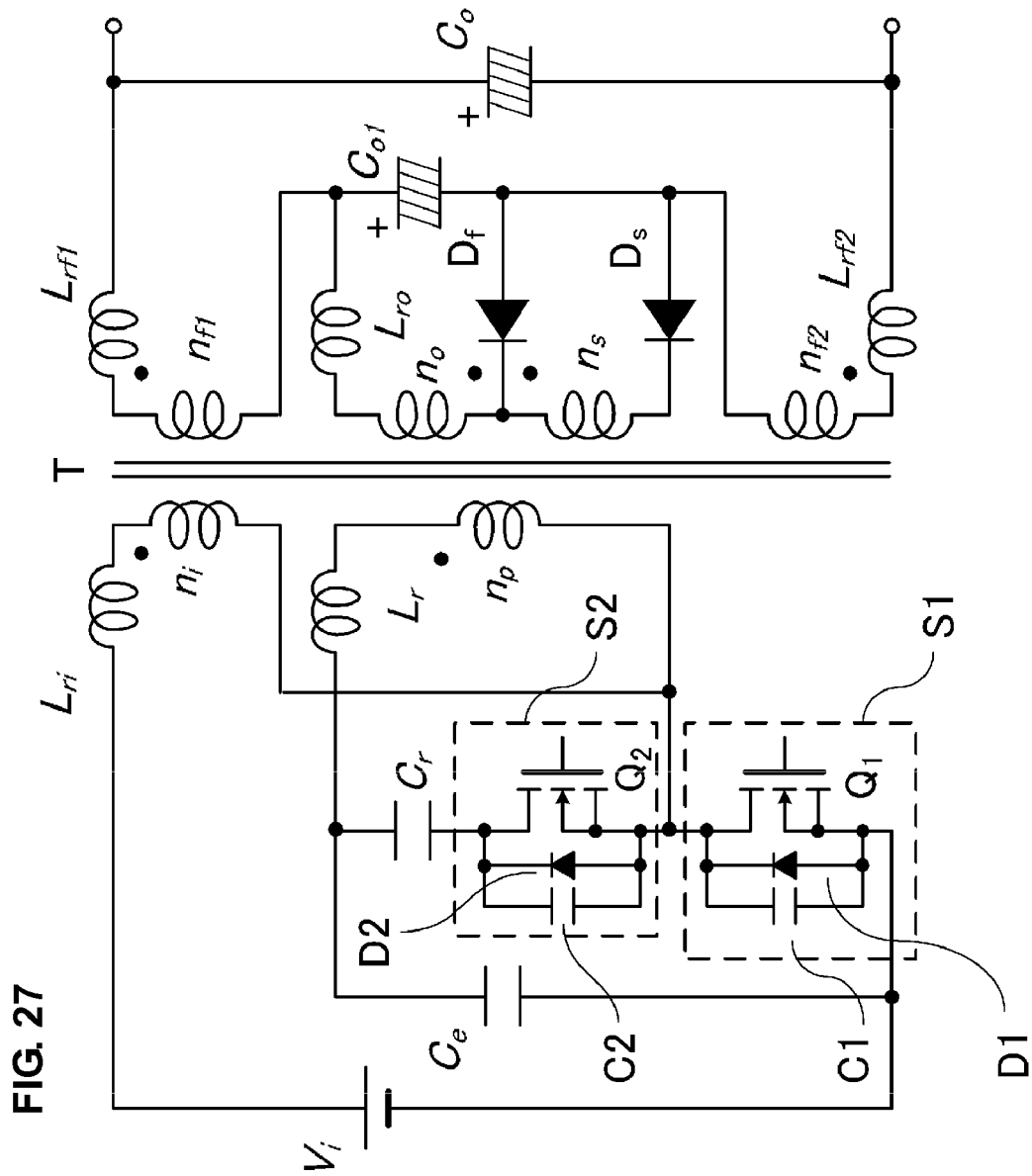
FIG. 27 is a circuit diagram of the isolated switching power supply apparatus of a twenty-second preferred embodiment of the present invention.

FIG. 27 is a circuit diagram of the isolated switching power supply apparatus according to a twenty-second preferred embodiment of the present invention.

The isolated switching power supply apparatus illustrated in FIG. 27 is similar in the primary side circuit to the sixteenth preferred embodiment illustrated in FIG. 21. In the secondary side circuit, the isolated switching power supply apparatus illustrated in FIG. 27 is different from the sixteenth preferred embodiment illustrated in FIG. 21 in that the third capacitor Co1 is preferably connected between both ends of the fourth secondary winding no. With this arrangement, two stages of low-pass filter are provided, which further reduces ripple current.

The twenty-second preferred embodiment provides substantially the same operation and advantages as those of the first preferred embodiment of the present invention as described above.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An isolated switching power supply apparatus arranged to transfer energy from a primary side to a secondary side in response to an on/off operation of a first switching circuit, comprising:
   a direct-current power supply input unit arranged to receive a direct-current input voltage; and
   a first transformer including a first primary winding, a first secondary winding, a second secondary winding, and a third secondary winding that are magnetically coupled to each other; wherein
   the first switching circuit includes a parallel circuit including a first switching element, a first capacitor, and a first diode;
   a series circuit including the first primary winding and the first switching circuit is connected in series with the direct-current power supply input unit;
   a first inductor defined by a leakage inductance of the second secondary winding is arranged in series with the second secondary winding nf1;
   a second inductor defined by a leakage inductance of the third secondary winding is arranged in series with the third secondary winding and a second capacitor defining a low-pass filter together with the first inductor and the second inductor;
   the second secondary winding and the third secondary winding are wound to include the same number of turns and to have opposite magnetic polarities;
   the first secondary winding, the second secondary winding, and the third secondary winding are connected in series with the first capacitor to define a closed loop; and
   an output terminal of the low-pass filter is arranged to output an output voltage.

2. The isolated switching power supply apparatus according to claim 1, wherein
   the first primary winding and the first secondary winding are wound to have the same magnetic polarity; and
   a forward converter is provided and includes a second diode arranged to remain turned on during an on period of the first switching circuit S1 and a third diode arranged to remain turned on during an off period of the first switching circuit.

3. The isolated switching power supply apparatus according to claim 1, wherein
the first primary winding and the first secondary winding are wound to have opposite magnetic polarities; and
a flyback converter is provided on the first secondary winding and includes a rectifying and smoothing circuit including a first diode arranged to remain turned on during an off period of the first switching circuit and a third capacitor arranged to perform a discharging operation during the on period of the first switching circuit and to perform a charging operation during the off period of the first switching circuit.

4. The isolated switching power supply apparatus according to claim 1, further comprising:
a fourth capacitor;
a second switching circuit including a parallel circuit including a second switching element, a fifth capacitor, and a fourth diode; and
a third inductor defined by a leakage inductance of the first primary winding connected in series with the first primary winding; wherein
a series circuit including the first primary winding and the first switching circuit is connected to the direct-current power supply input unit; and
a series circuit including the fourth capacitor and the second switching circuit is connected in parallel with one of the first primary winding and the first switching circuit.

5. The isolated switching power supply apparatus according to claim 1, further comprising:
a second switching circuit including a parallel circuit including a second switching element, a fifth capacitor, and a fourth diode;
a sixth capacitor;
a seventh capacitor; and
a third inductor defined by a leakage inductance of the first primary winding connected in series with the first primary winding; wherein
each of a series circuit including the first switching circuit and the second switching circuit and a series circuit including the sixth capacitor and the seventh capacitor is connected in parallel with the direct-current power supply input unit; and
a half-bridge circuit is provided by connecting the first primary winding between a junction of the first switching circuit and the second switching circuit and a junction of the sixth capacitor and the seventh capacitor.

6. The isolated switching power supply apparatus according to claim 1, further comprising:
a second switching circuit including a parallel circuit including a second switching element, a fifth capacitor, and a fourth diode;
a third switching circuit including a parallel circuit including a third switching element, an eighth capacitor, and a fifth diode;
a fourth switching circuit including a parallel circuit including a fourth switching element, a ninth capacitor, and a sixth diode; and
a third inductor defined by a leakage inductance of the first primary winding connected in series with the first primary winding; wherein
each of a series circuit including the first switching circuit and the second switching circuit and a series circuit including the third switching circuit and the fourth switching circuit is connected in parallel with the direct-current power supply input unit; and
a full-bridge circuit is provided by connecting the first primary winding between a junction of the first switching circuit and the second switching circuit and a junction of the third switching circuit and the fourth switching circuit.

7. The isolated switching power supply apparatus according to claim 1, wherein
the transformer includes the first primary winding including a second primary winding and a third primary winding with one end of the second primary winding connected to one end of the third primary winding;
the isolated switching power supply apparatus includes a second switching circuit including a parallel circuit including a second switching element, a fifth capacitor, and a fourth diode; and
each of a series circuit including the second primary winding and the second switching circuit and a series circuit including the third primary winding and the first switching circuit is connected in parallel with the direction-current power supply input unit.

8. The isolated switching power supply apparatus according to claim 1, further comprising:
the transformer including a fourth primary winding and a fourth secondary winding;
a second switching circuit including a parallel circuit including a second switching element, a fifth capacitor, and a fourth diode;
a fourth capacitor;
a tenth capacitor;
a third inductor defined by a leakage inductance of the first primary winding connected in series with the first primary winding; and
a fourth inductor defined by a leakage inductance of the fourth primary winding connected in series with the fourth primary winding; wherein
each of a series circuit including the fourth primary winding and the first switching circuit and a series circuit including the first primary winding and the tenth capacitor is connected in parallel with the direct-current power supply input unit; and
a series circuit including the second switching circuit and the fourth capacitor is connected in parallel with one of the first primary winding and the first switching circuit.

9. The isolated switching power supply apparatus according to claim 1, wherein
the transformer includes a first secondary winding and a fourth secondary winding, the first secondary winding being wound such that energy is transferred from the primary side to the secondary side of the transformer during an on period of the first switching circuit and an off period of the second switching circuit, and the fourth secondary winding being wound such that energy is transferred from the primary side to the secondary side of the transformer during an off period of the first switching circuit and an on period of the second switching circuit;
the first secondary winding is connected in series with the fourth secondary winding;
the isolated switching power supply apparatus includes a fifth inductor defined by a leakage inductance of the fourth secondary winding connected in series with the fourth secondary winding; and
a second diode arranged to remain turned on during the on period of the first switching circuit is connected to a third diode arranged to remain turned on during the off period of the first switching circuit.

10. The isolated switching power supply apparatus according to claim 9, wherein a ratio of winding of the first secondary winding to the fourth secondary winding is set to approximately 2:1.

11. The isolated switching power supply apparatus according to claim 4, wherein a center-tap rectifying circuit is provided by connecting one end of the first secondary winding to one end of the fourth secondary winding and by connecting the other end of each of the first secondary winding and the fourth secondary winding to one of the second diode and the third diode.

12. The isolated switching power supply apparatus according to claim 4, further comprising:
- a voltage doubler rectifying circuit including:
    - a second diode including a cathode connected to one end of the first secondary winding and an anode connected to one end of an eleventh capacitor;
    - a third diode including an anode connected to the one end of the first secondary winding and a cathode connected to a third capacitor Co1; wherein
- the other end of the first secondary winding is connected to the other end of the eleventh capacitor and to the other end of the third capacitor.

13. The isolated switching power supply apparatus according to claim 1, wherein the second secondary winding is connected between one end of the first secondary winding and a high-voltage terminal of the second capacitor, and the third secondary winding is connected between the other end of the first secondary winding and a low-voltage terminal of the second capacitor.

14. The isolated switching power supply apparatus according to claim 1, wherein
- the first transformer further comprises a fifth secondary winding and a sixth secondary winding;
- the fifth secondary winding and the sixth secondary winding are wound to include the same number of turns and to have opposite magnetic polarities;
- the second secondary winding, the third secondary winding, the fifth secondary winding, and the sixth secondary winding are connected in series with the first secondary winding;
- the isolated switching power supply apparatus further includes a sixth inductor defined by a leakage inductance of the fifth secondary winding connected in series with the fifth secondary winding;
- a seventh inductor defined by a leakage inductance of the sixth secondary winding connected in series with the sixth secondary winding
- a second capacitor defining a first low-pass filter together with the sixth inductor and the seventh inductor; and
- a third capacitor defining a second low-pass filter together with the second inductor and the third inductor, and
- an output terminal of the first low-pass filter is arranged to output an output voltage.

15. The isolated switching power supply apparatus according to claim 9, wherein
- the first transformer further includes a fifth secondary winding and a sixth secondary winding;
- the fifth secondary winding and the sixth secondary winding are wound to include the same number of turns and to have opposite magnetic polarities;
- the second secondary winding, the third secondary winding, the fifth secondary winding, and the sixth secondary winding are connected in series with the first secondary winding;
- the isolated switching power supply apparatus further includes a fifth inductor defined by a leakage inductance of the fourth secondary winding connected in series with the fourth secondary winding;
- a sixth inductor defined by a leakage inductance of the fifth secondary winding connected in series with the fifth secondary winding nf3;
- a seventh inductor defined by a leakage inductance of the sixth secondary winding connected in series with the sixth secondary winding, a second capacitor defining a first low-pass filter together with the sixth inductor and the seventh inductor, a third capacitor defining a second low-pass filter together with the second inductor and the third inductor, and an eleventh capacitor defining a third low-pass filter together with the fifth inductor; and
- an output terminal of the first low-pass filter is arranged to output an output voltage.

* * * * *